(12) United States Patent
Deering

(10) Patent No.: US 7,199,806 B2
(45) Date of Patent: Apr. 3, 2007

(54) RASTERIZATION OF PRIMITIVES USING PARALLEL EDGE UNITS

(75) Inventor: Michael F. Deering, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 301 days.

(21) Appl. No.: 10/392,282

(22) Filed: Mar. 19, 2003

(65) Prior Publication Data
US 2004/0183801 A1 Sep. 23, 2004

(51) Int. Cl.
*G06T 15/30* (2006.01)
*G06T 17/20* (2006.01)

(52) U.S. Cl. .................. 345/621; 345/423
(58) Field of Classification Search ........ 345/619–624, 345/423
See application file for complete search history.

(56) References Cited

U.S. PATENT DOCUMENTS

| | | | | |
|---|---|---|---|---|
| 5,313,566 A | * | 5/1994 | Hedley et al. ............... | 345/419 |
| 5,670,981 A | * | 9/1997 | Jensen ......................... | 345/603 |
| 5,903,273 A | * | 5/1999 | Mochizuki et al. ......... | 345/423 |
| 6,545,675 B1 | * | 4/2003 | Moriwaki et al. .......... | 345/419 |
| 6,577,305 B1 | * | 6/2003 | Duluk et al. ................ | 345/419 |
| 6,611,264 B1 | * | 8/2003 | Regan ......................... | 345/422 |
| 2002/0190988 A1 | * | 12/2002 | Maillot et al. .............. | 345/428 |
| 2003/0179200 A1 | * | 9/2003 | Martin et al. ............... | 345/428 |

OTHER PUBLICATIONS

Robert L. Cook, Loren Carpenter, Edwin Catmull, The Reyes Image Rendering Architecture, Jul. 1987, ACM SIGGRAPH Computer Graphics, Proceedings of the 14th annual conference on Computer graphics and interactive techniques SIGGRAPH '87, vol. 21, No. 4, pp. 95-102.*
John D. Owens, Brucek Khailany, Brian Towles, William J. Dally, Comparing Reyes and OpenGL on a Stream Architecture, Sep. 2002, Proceedings of the ACM SIGGRAPH/EUROGRAPHICS conference on Graphics hardware, pp. 47-56.*

* cited by examiner

*Primary Examiner*—Jeffery A. Brier
(74) *Attorney, Agent, or Firm*—Meyertons Hood Kivlin Kowert & Goetzel, P.C.; Jeffrey C. Hood; Mark K. Brightwell

(57) ABSTRACT

A graphical computing system comprising a control unit and a set of edge processing units. The control unit (a) receives a surface primitive, (b) transfers edge specifying information for each edge of the surface primitive to a corresponding one of the edge processing units, and (c) transfers a horizontal address $C_X$ and a vertical address $C_Y$ of a current pixel to the edge processing units. Each of the edge processing units computes trimming information for the current pixel with respect to the corresponding edge using the horizontal address $C_X$ and vertical address $C_Y$. The trimming information specifies a portion of the corresponding edge which intersects the current pixel. The control unit collects the trimming information from the edge processing units and transmits an output packet including the addresses $C_X$ and $C_Y$ of the current pixel along with the collected trimming information.

21 Claims, 16 Drawing Sheets

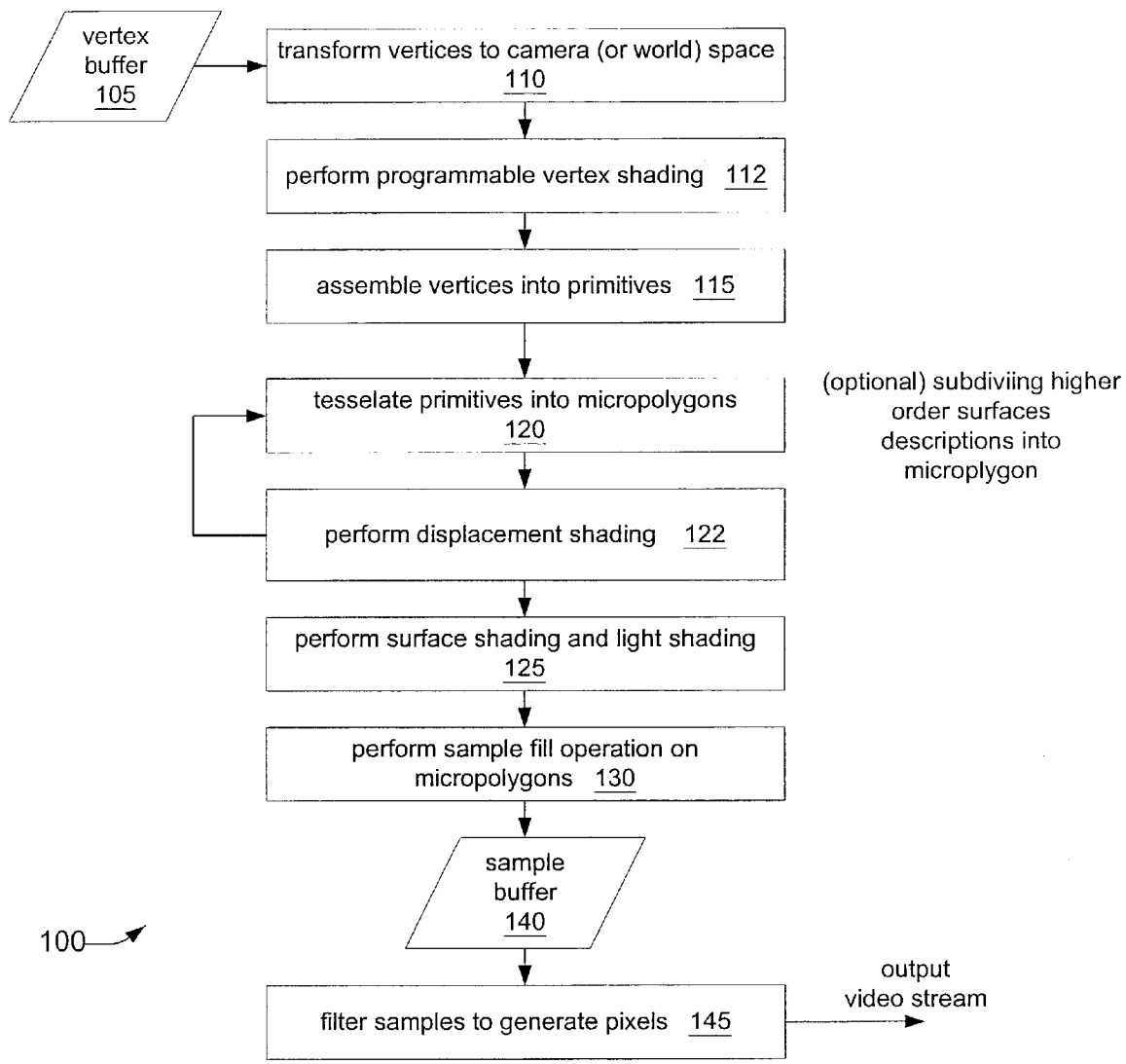
Fig. 1: Rendering Pipeline

RASTERIZATION OF PRIMITIVES USING PARALLEL EDGE UNITS

BACKGROUND OF THE INVENTION

1. Field of the Invention

This invention relates generally to the field of computer graphics and, more particularly, to a system and method for generating a set of trimmed pixels representing a surface primitives (e.g., a triangle or a quadrilateral).

2. Description of the Related Art

Graphics system may be configured to receive surface primitives (representing graphical objects in a three-dimensional space) such as triangles, perform shading operations to determine color values at the vertices of the primitives, and interpolate color values for pixels covering the primitives from the color values at the vertices. To achieve more visual realism it would be desirable perform programmable shading operations such as bump mapping, displacement mapping and lighting at pixel resolution. However, conventional methodologies for rasterizing primitives into pixels do not support (or do not provide adequate support) for such operations at pixel resolution. Thus, there exists a need for systems and methodologies capable of rasterizing primitives in a manner suited for interfacing with per-pixel programmable shaders.

SUMMARY

In one set of embodiments, a graphical computing system may include a control unit and a set of edge processing units. The control unit (a) receives a surface primitive, (b) transfers edge specifying information for each edge of the surface primitive to a corresponding one of the edge processing units, and (c) transfers a horizontal address $C_X$ and a vertical address $C_Y$ of a current pixel to the edge processing units. Each of the edge processing units computes trimming information for the current pixel with respect to the corresponding edge using the horizontal address $C_X$ and vertical address $C_Y$. The trimming information specifies a portion of the corresponding edge which intersects the current pixel. The control unit collects the trimming information from the edge processing units and transmits an output packet including the addresses $C_X$ and $C_Y$ of the current pixel along with the collected trimming information.

Each processing unit may include a series of processing stages. A first stage of the processing stages may be configured to receive a first vertex and a second vertex defining an edge of a primitive, to compute horizontal and vertical deltas between the first vertex and second vertex, to compare an upper set of bits (e.g., bits above the binary point) in a horizontal coordinate of the first vertex to an upper set of bits in a horizontal coordinate of the second vertex to determine if the edge lies within a horizontal scan line of pixels, to compare an upper set of bits in a vertical coordinate of the first vertex to an upper set of bits in a vertical coordinate of the second vertex to determine if the edge lies within a vertical column of pixels.

A second stage of the processing stages may be configured to compute reciprocals of the horizontal and vertical deltas, to transmit the minimum of the vertical coordinates of the first vertex and second vertex to a vertical minimum unit based on a sign of the vertical delta, to transmit the maximum of the vertical coordinates of the first vertex and the second vertex to a vertical maximum unit based on the sign of the vertical delta.

A third stage of the processing stages may be configured to interpolate a new vertex position along the primitive edge at a vertical coordinate equal to a vertical component of the current pixel plus a constant. The constant may equal one, or more generally, the vertical height of a pixel. In an alternative embodiment, the constant may equal minus one A fourth stage of the processing stages may be configured to compute a first control bit indicating whether a vertical coordinate of a current pixel equals a floor of a maximum of the vertical coordinates of the first vertex and the second vertex, to send a minimum of the horizontal coordinates of the first vertex and the second vertex to a horizontal minimum unit, to send a maximum of the horizontal coordinates of the first vertex and the second vertex to a horizontal maximum unit.

A fifth stage of the processing stages may be configured to compute a first set of indicator bits by comparing a floor of a horizontal coordinate of an intersection of the primitive edge with a bottom boundary of the current scan line of pixels (i.e., the scan line containing the current pixel), to compute a second set of indicator bits by comparing a floor of a horizontal coordinate of an intersection of the primitive edge with a top boundary of the current scan line of pixels, to compute an in-edge indicator using the first set of indicator bits and the second set of indicator bits, to compute trimming information for the current pixel in response to the in-edge indicator equaling a first state indicating that the current pixel is intersected by the primitive edge, wherein the trimming information specifies that portion of the primitive edge which intersects the current pixel.

BRIEF DESCRIPTION OF THE DRAWINGS

A better understanding of the present invention can be obtained when the following detailed description is considered in conjunction with the following drawings, in which:

FIG. 1 illustrates one set of embodiments of a graphics rendering pipeline;

Figure 2A:
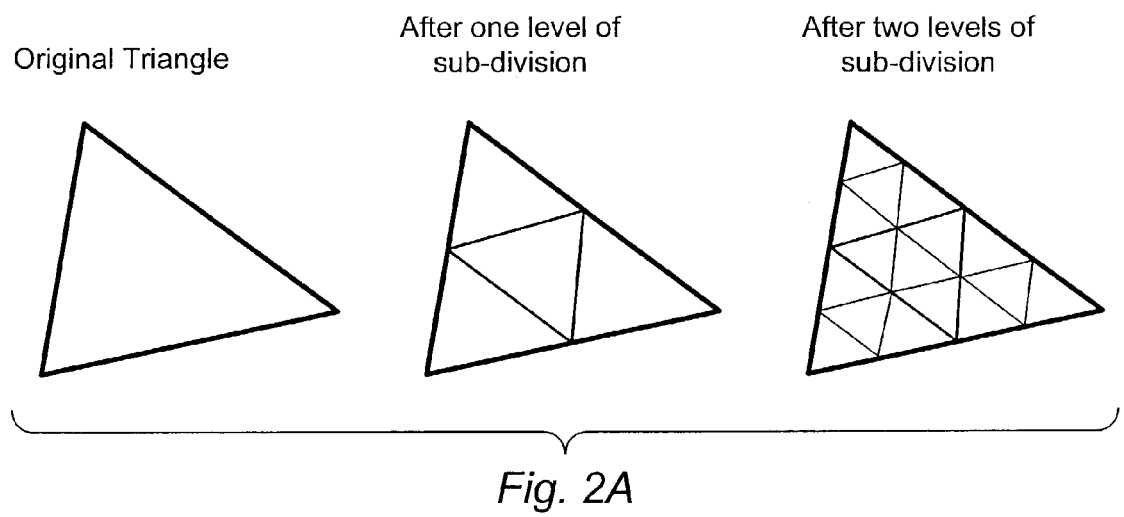
FIG. 2A illustrates one embodiment of a triangle fragmentation process.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Various Spaces

Model Space: The space in which an object (or set of objects) is defined.

Virtual World Space: The space in which a scene comprising a collection of objects and light sources may be constructed. Each object may be injected into virtual world space with a transformation that achieves any desired combination of rotation, translation and scaling of the object. In older terminology, virtual world space has often been referred to simply as "world space".

Camera Space: A space defined by a transformation $T^{VC}$ from virtual world space. The transformation $T^{VC}$ may achieve a combination of translation, rotation, and scaling. The translation and rotation account for the current position and orientation of a virtual camera in the virtual world space. The coordinate axes of camera space are rigidly bound to the virtual camera. In OpenGL, camera space is referred to as "eye space".

Clipping Space: A space defined by a transform $T^{CX}$ from camera space before any perspective division by the W coordinate, and is used as an optimization in some clipping algorithms. In clipping space, the sides of the perspective-projection view volume may occur on the bounding planes $X=\pm W$, $Y=\pm W$, $Z=0$ and $Z=-W$. Clipping space is not mandated by the abstract rendering pipeline disclosed herein, and is defined here as a convenience for hardware implementations that choose to employ it.

Image Plate Space: A two-dimensional space with a normalized extent from –1 to 1 in each dimension, created after perspective division by the W coordinate of clipping space, but before any scaling and offsetting to convert coordinates into render pixel space).

Pixel Plate Space: A two-dimensional space created after perspective division by the W coordinate of camera space, but before any scaling and offsetting to convert coordinates into render pixel space.

Render Pixel Space: A space defined by a transform $T^{IR}$ from image plate space (or a transform $T^{JR}$ from pixel plate space). The transform $T^{IR}$ (or $T^{JR}$) scales and offsets points from image plate space (or pixel plate space) to the native space of the rendered samples. See FIGS. 7 and 8.

Video Pixel Space: According to the abstract rendering pipeline defined herein, a filtering engine generates virtual pixel positions in render pixel space (e.g., as suggested by the plus markers of FIG. 8), and may compute a video pixel at each of the virtual pixel positions by filtering samples in the neighborhood of the virtual pixel position. The horizontal displacement $\Delta x$ and vertical displacement $\Delta y$ between virtual pixel positions are dynamically programmable values. Thus, the array of virtual pixel positions is independent of the array of render pixels. The term "video pixel space" is used herein to refer to the space of the video pixels.

Texture Vertex Space: The space of the texture coordinates attached to vertices. Texture vertex space is related to texture image space by the currently active texture transform. (Effectively, every individual geometry object defines its own transform from texture vertex space to model space, by the association of the position, texture coordinates, and possibly texture coordinate derivatives with all the vertices that define the individual geometry object.)

Texture Image Space: This is a space defined by the currently active texture transform. It is the native space of texture map images.

Light Source Space: A space defined by a given light source.

Abstract Rendering Pipeline

FIG. 1 illustrates a rendering pipeline 100 that supports per-pixel programmable shading. The rendering pipeline 100 defines an abstract computational model for the generation of video pixels from primitives. Thus, a wide variety of hardware implementations of the rendering pipeline 100 are contemplated.

Vertex data packets may be accessed from a vertex buffer 105. A vertex data packet may include a position, a normal vector, texture coordinates, texture coordinate derivatives, and a color vector. More generally, the structure of a vertex data packet is user programmable. As used herein the term vector denotes an ordered collection of numbers.

In step 110, vertex positions and vertex normals may be transformed from model space to camera space or virtual world space. For example, the transformation from model space to camera space may be represented by the following expressions:

$$X^C = T^{MC} X^M,$$

$$N^C = G^{MC} n^M.$$

If the normal transformation $G^{MC}$ is not length-preserving, the initial camera space vector $N^C$ may be normalized to unit length:

$$n^C = N^C / \text{length}(N^C).$$

For reasons that will become clear shortly, it is useful to maintain both camera space (or virtual world space) position and render pixel space position for vertices at least until after tessellation step 120 is complete. (This maintenance of vertex position data with respect to two different spaces is referred to herein as "dual bookkeeping".) Thus, the camera space position $X^C$ may be further transformed to render pixel space:

$$X^R = T^{CR} X^C.$$

The camera-space-to-render-pixel-space transformation $T^{CR}$ may be a composite transformation including transformations from camera space to clipping space, from clipping space to image plate space (or pixel plate space), and from image plate space (or pixel plate space) to render pixel space.

In step 112, one or more programmable vertex shaders may operate on the camera space (or virtual world space) vertices. The processing algorithm performed by each vertex shader may be programmed by a user. For example, a vertex shader may be programmed to perform a desired spatial transformation on the vertices of a set of objects.

In step 115, vertices may be assembled into primitives (e.g. polygons or curved surfaces) based on connectivity information associated with the vertices. Alternatively, vertices may be assembled into primitives prior to the transformation step 110 or programmable shading step 112.

In step 120, primitives may be tessellated into micropolygons. In one set of embodiments, a polygon may be declared to be a micropolygon if the projection of the polygon in render pixel space satisfies a maximum size constraint. The nature of the maximum size constraint may vary among hardware implementations. For example, in some implementations, a polygon qualifies as a micropolygon when each edge of the polygon's projection in render pixel space has length less than or equal to a length limit $L_{max}$ in render pixel space. The length limit $L_{max}$ may equal one or one-half. More generally, the length limit $L_{max}$ may equal a user-programmable value, e.g., a value in the range [0.5,2.0].

As used herein the term "tessellate" is meant to be a broad descriptive term for any process (or set of processes) that operates on a geometric primitive to generate micropolygons.

Tessellation may include a triangle fragmentation process that divides a triangle into four subtriangles by injecting three new vertices, i.e, one new vertex at the midpoint of each edge of the triangle as suggested by FIG. 2A. The triangle fragmentation process may be applied recursively to each of the subtriangles. Other triangle fragmentation processes are contemplated. For example, a triangle may be subdivided into six subtriangles by means of three bisecting segments extending from each vertex of the triangle to the midpoint of the opposite edge.

Figure 2B:
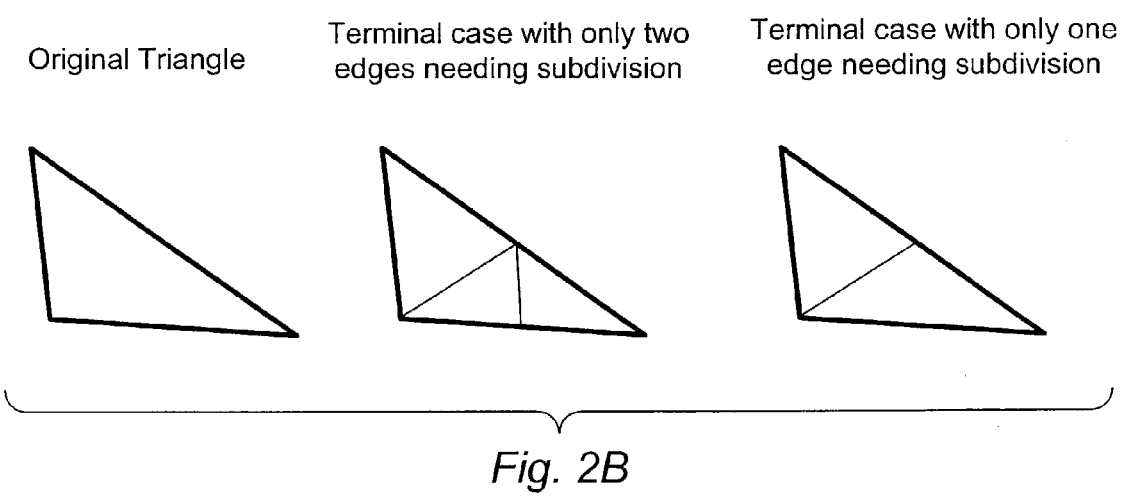
FIG. 2B illustrates several termination criteria for a triangle fragmentation process.

FIG. 2B illustrates means for controlling and terminating a recursive triangle fragmentation. If a triangle resulting from an application of a fragmentation process has all three edges less than or equal to a termination length $L_{term}$, the triangle need not be further fragmented. If a triangle has exactly two edges greater than the termination length $L_{term}$ (as measured in render pixel space), the triangle may be divided into three subtriangles by means of a first segment extending from the midpoint of the longest edge to the opposite vertex, and a second segment extending from said midpoint to the midpoint of the second longest edge. If a triangle has exactly one edge greater than the termination length $L_{term}$, the triangle may be divided into two subtriangles by a segment extending from the midpoint of the longest edge to the opposite vertex.

Figure 3A:
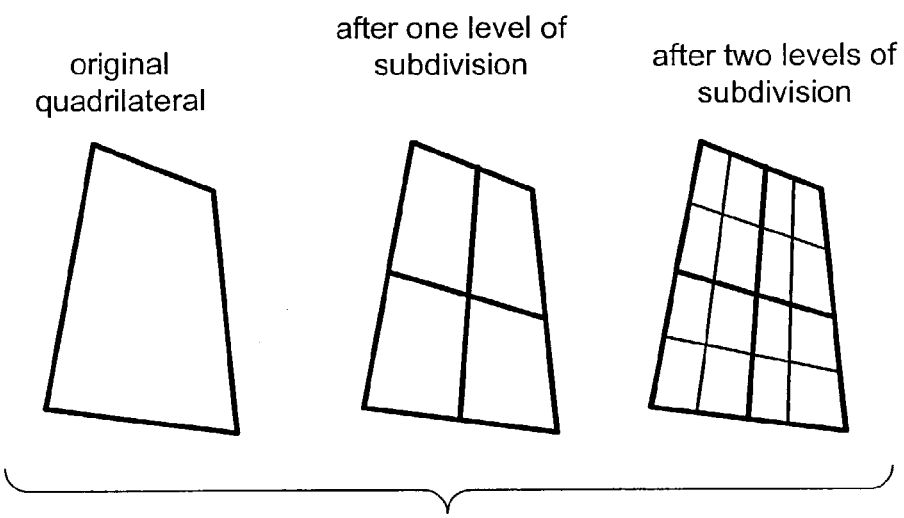
FIG. 3A illustrates one embodiment of a quadrilateral fragmentation process.

Tessellation may also include a quadrilateral fragmentation process that fragments a quadrilateral into four subquadrilaterals by dividing along the two bisectors that each extend from the midpoint of an edge to the midpoint of the opposite edge as illustrated in FIG. 3A. The quadrilateral fragmentation process may be applied recursively to each of the four subquadrilaterals.

Figure 3B:
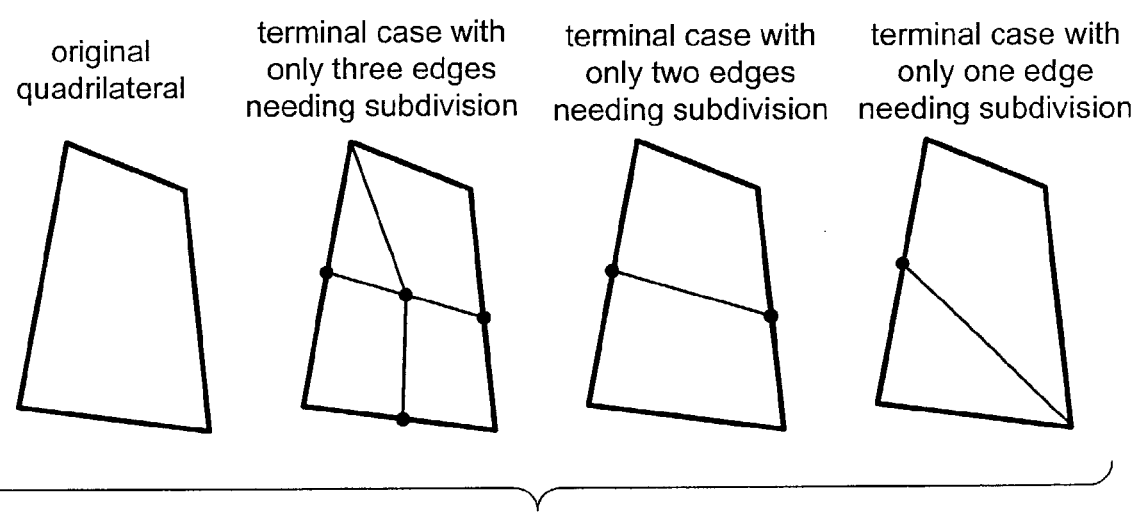
FIG. 3B illustrates several termination criteria for a quadrilateral fragmentation process.

FIG. 3B illustrates means for controlling and terminating a recursive quadrilateral fragmentation. If a quadrilateral resulting from an application of the quadrilateral fragmentation process has all four edges less than or equal to the termination length $L_{term}$, the quadrilateral need not be further fragmented. If the quadrilateral has exactly three edges greater than the termination length $L_{term}$, and the longest and second longest edges are nonadjacent, the quadrilateral may be divided into three subquadrilaterals and a triangle by means of segments extending from an interior point to the midpoints of the three longest edges, and a segment extending from the interior point to the vertex which connects the smallest edge and longest edge. (The interior point may be the intersection of the two lines which each extend from an edge midpoint to the opposite edge midpoint.) If the quadrilateral has exactly two sides greater than the termination length limit $L_{term}$, and the longest edge and the second longest edge are nonadjacent, the quadrilateral may be divided into two subquadrilaterals by means of a segment extending from the midpoint of the longest edge to the midpoint of the second longest edge. If the quadrilateral has exactly one edge greater than the termination length $L_{term}$, the quadrilateral may be divided into a subquadrilateral and a subtriangle by means of a segment extending from the midpoint of the longest edge to the vertex which connects the second longest edge and the third longest edge. The cases given in FIG. 3B are not meant be an exhaustive list of termination criteria.

Figure 4:
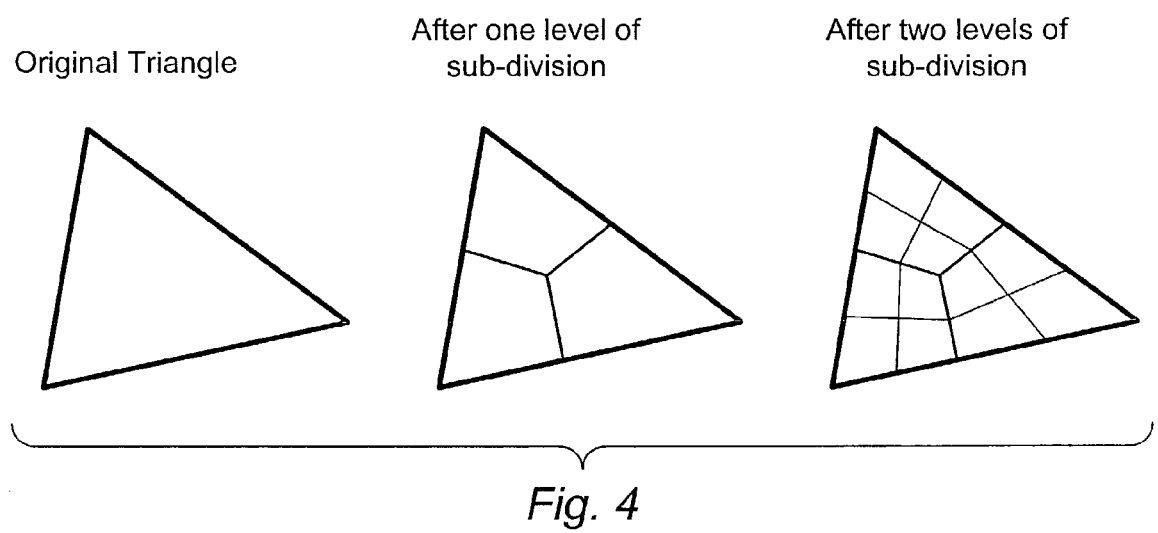
FIG. 4 illustrates one embodiment of a fragmentation process that operates on triangles to generate component quadrilaterals.

In some embodiments, tessellation may include algorithms that divide one type of primitive into components of another type. For example, as illustrated in FIG. 4, a triangle may be divided into three subquadrilaterals by means of segments extending from an interior point (e.g. the triangle centroid) to the midpoint of each edge. (Once the triangle has been the divided into subquadrilaterals, a quadrilateral fragmentation process may be applied recursively to the subquadrilaterals.) As another example, a quadrilateral may be divided into four subtriangles by means of two diagonals that each extend from a vertex of the quadrilateral to the opposite vertex.

Figure 5A:
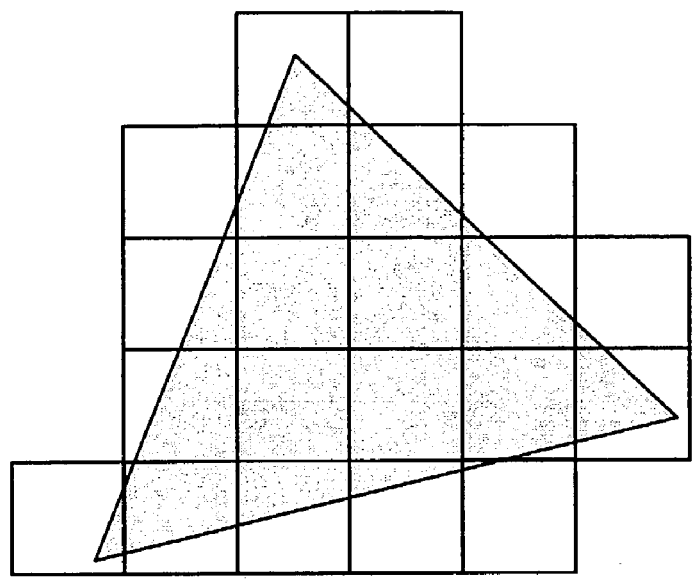
FIGS. 5A and 5B illustrate one embodiment of a method for fragmenting a primitive based on render pixels.
Figure 5B:
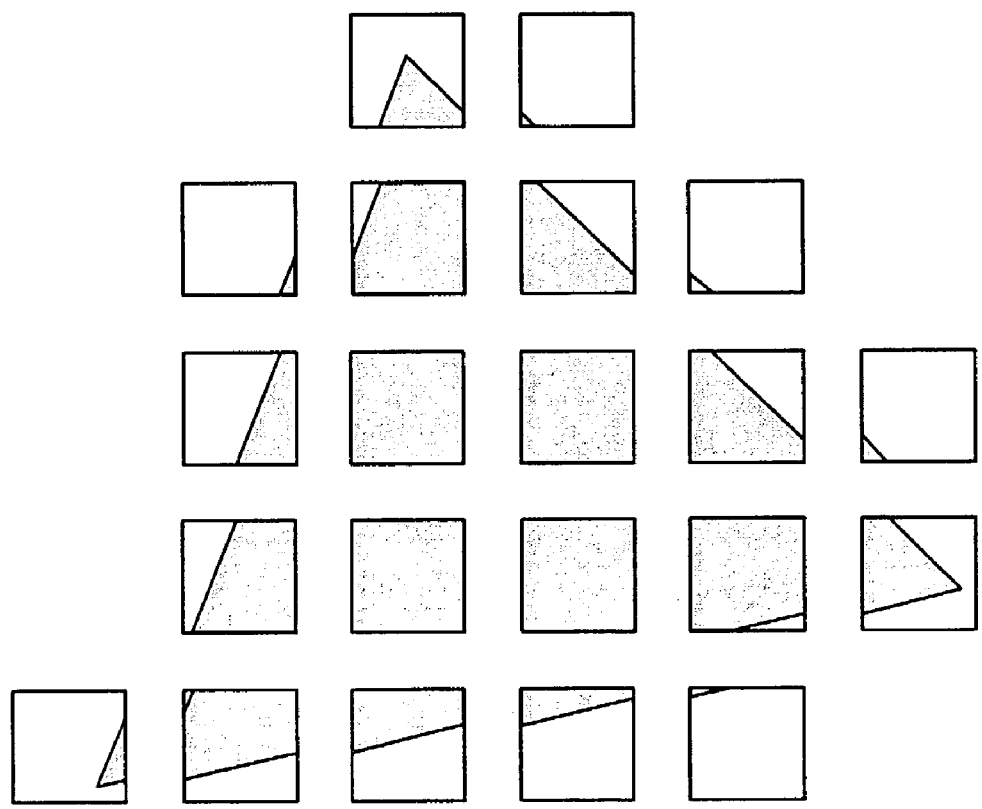

In some embodiments, tessellation may involve the fragmentation of primitives into micropolygons based on an array of render pixels as suggested by FIGS. 5A and 5B. FIG. 5A depicts a triangular primitive as seen in render pixel space. The squares represent render pixels in render pixel space. Thus, the primitive intersects 21 render pixels. Seventeen of these render pixels are cut by one or more edges of the primitive, and four are completely covered by the primitive. A render pixel that is cut by one or more edges of the primitive is referred to herein as a trimmed render pixel (or simply, trimmed pixel). A render pixel that is completely covered by the primitive is referred to herein as a microsquare.

The tessellation process may compute edge-trimming information for each render pixel that intersects a primitive P. The edge-trimming information for a given render pixel may include a specification of that portion of each edge (of the primitive P) that intersects the render pixel. For example, in one embodiment, the edge-trimming information includes a specification of the following data for each edge of the primitive P that intersects the render pixel:

(a) points at which the edge intersects the boundary of the render pixel and (b) any endpoints of the edge which reside interior to the render pixel.

For a given edge of the primitive P that intersects the render pixel, the edge-trimming information may also include:

a bit $B_1$ indicating which side of the edge contains the interior of the primitive P;

a bit $B_2$ indicating whether the primitive P owns the edge (where ownership indicates that a sample position falling on the edge E is be counted as belonging to the primitive for the sake of sample-fill processing.

Furthermore, for a vertex of an edge that lies within (or on the boundary of) the render pixels, the edge-trimming information may include:

a bit $B_3$ indicating whether the vertex is owned by the primitive P (where ownership of the vertex indicates that a sample position falling on the vertex is to be counted as belonging to the primitive for the sake of sample-fill processing.

The tessellation process employs a consistent set of rules for determining bits $B_1$, $B_2$ and $B_3$. For example, in one embodiment, the bit $B_3$ may be computed based on a determination if the render pixel space projection of the primitive P contains a fixed direction ray emanating from the vertex. For example, the fixed direction ray may be the ray that points into the quadrant x<0 and y<0 along the line x=y, where x and y are the coordinates of render pixel space.

FIG. 5B illustrates an exploded view of the 21 render pixels intersected by the triangular primitive. Observe that of the seventeen trimmed render pixels, four are trimmed by two primitive edges, and the remaining thirteen are trimmed by only one primitive edge.

In some embodiments, tessellation may involve the use of different fragmentation processes at different levels of scale. For example, a first fragmentation process (or a first set of fragmentation processes) may have a first termination length which is larger than the length limit $L_{max}$. A second fragmentation process (or a second set of fragmentation processes) may have a second termination length which is equal to the length limit $L_{max}$. The first fragmentation process may receive arbitrary sized primitives and break them down into intermediate size polygons (i.e. polygons that have maximum side length less than or equal to the first termination length). The second fragmentation process takes the intermediate size polygons and breaks them down into micropolygons (i.e., polygons that have maximum side length less than or equal to the length limit $L_{max}$).

The rendering pipeline 100 may also support curved surface primitives. The term "curved surface primitive" covers a large number of different non-planar surface patch descriptions, including quadric and Bezier patches, NURBS, and various formulations of sub-division surfaces. Thus, tessellation step 120 may include a set of fragmentation processes that are specifically configured to handle curved surfaces of various kinds.

Given an edge (e.g. the edge of a polygon) defined by the vertices $V_1$ and $V_2$ in camera space, the length of the edge's projection in render pixel space may be computed according to the relation $\|v_2-v_1\|$, where $v_1$, and $v_2$ are the projections of $V_1$ and $V_2$ respectively into render pixel space, where $\|*\|$ denotes a vector norm such as the $L^1$ norm, the $L^{2\infty}$ norm, or Euclidean norm, or, an approximation to a vector norm. The $L^1$ norm of a vector is the sum of the absolute values of the vector components. The $L^\infty$ norm of a vector is the maximum of the absolute values of the vector components. The Euclidean norm of a vector is the square root of the sum of the squares of the vector components.

In some implementations, primitives may be tessellated into "microquads", i.e., micropolygons with at most four edges. In other implementations, primitives may be tessellated into microtriangles, i.e., micropolygons with exactly three edges. More generally, for any integer $N_S$ greater than or equal to three, a hardware system may be implemented to subdivide primitives into micropolygons with at most $N_S$ sides.

Figure 6:
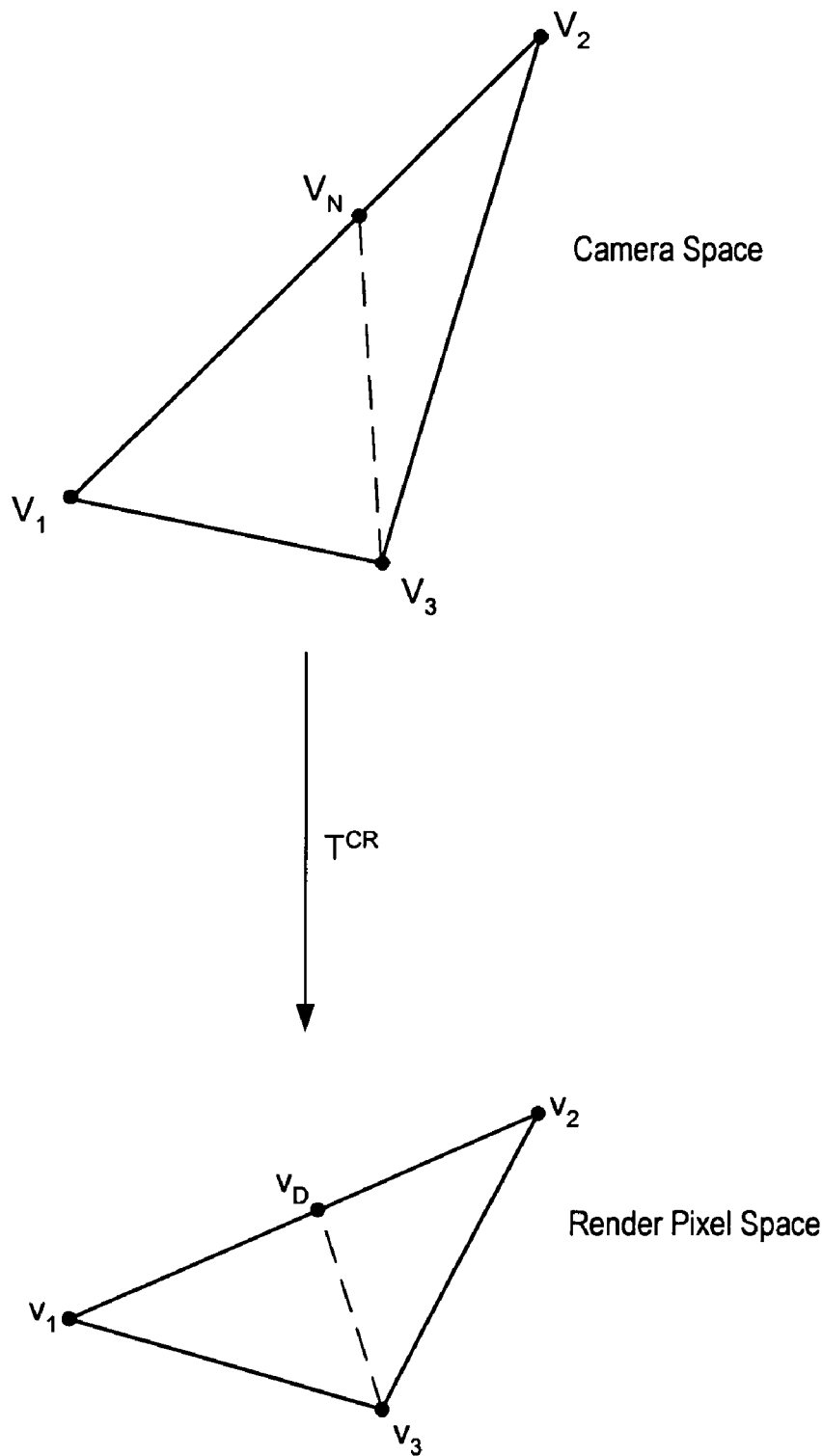
FIG. 6 illustrates a triangle in camera space and its projection into render pixel space.

The tessellation process may involve computations both in camera space and render pixel space as suggested by FIG. 6. A triangle in camera space defined by the vertices $V_1$, $V_2$ and $V_3$ projects onto a triangle in render pixel space defined by the vertices $v_1$, $v_2$ and $V_3$ respectively, i.e., $v_k=T^{CR}V_k$ for k=1, 2, 3. If a new vertex $V_N$ is injected along the edge from $V_1$ to $V_2$, two new subtriangles, having as their common edge the line segment from $V_N$ to $V_3$, may be generated.

Because the goal of the tessellation process is to arrive at component pieces which are sufficiently small as seen in render pixel space, the tessellation process may initially specify a scalar value $\sigma^R$ which defines a desired location $V_D$ along the screen space edge from v1 to v2 according to the relation $v_D=(1-\sigma^R)*v_1+\sigma^R*v_2$. (For example, one of the fragmentation processes may aim at dividing the screen space edge from v1 to v2 at its midpoint. Thus, such a fragmentation process may specify the value $\sigma^R=0.5$.) Instead of computing $V_D$ directly and then applying the inverse mapping $(T^{CR})^{-1}$ to determine the corresponding camera space point, the scalar value $\sigma^R$ may then be used to compute a scalar value $\sigma^C$ with the property that the projection of the camera space position $$V_N=(1-\sigma^C)*V_1+\sigma^C*V_2$$

into render pixel space equals (or closely approximates) the screen space point $V_D$. The scalar value $\sigma^C$ may be computed according to the formula:

$$\sigma^C = \left(\frac{1}{W_2-W_1}\right)\left(\frac{1}{\frac{1}{W_1}+\sigma^R\cdot\left(\frac{1}{W_2}-\frac{1}{W_1}\right)}-W_1\right),$$

where $W_1$ and $W_2$ are the W coordinates of camera space vertices $V_1$ and $V_2$ respectively. The scalar value $\sigma^C$ may then be used to compute the camera space position $V_N=(1-\sigma^C)*V_1+\sigma^C*V_2$ for the new vertex. Note that $\sigma^C$ is not generally equal to $\sigma^R$ since the mapping $T^{CR}$ is generally not linear. (The vertices $V_1$ and $V_2$ may have different values for the W coordinate.)

If $W_1=W_2$, the mapping $T^{CR}$ is linear and $\sigma^C$ is equal to $\sigma^R$. Thus, in some embodiments, the tessellation process may implement an epsilon test as follows. If the absolute value of the difference between $W_1$ and $W_2$ is smaller (or, less than or equal to) a value epsilon, the scalar $\sigma^C$ may be set equal to $\sigma^R$ (i.e., $\sigma^C \leftarrow \sigma^R$). The more complex equation above may be used when the absolute difference $|W_1-W_2|$ is greater than or equal to (or simply greater than) epsilon. The parameter epsilon may be programmable.

As illustrated above, tessellation includes the injection of new vertices along primitives edges and in the interior of primitives. Data components (such as color, surface normal, texture coordinates, texture coordinate derivatives, transparency, etc.) for new vertices injected along an edge may be interpolated from the corresponding data components associated with the edge endpoints. Data components for new vertices injecting in the interior of a primitive may be interpolated from the corresponding data components associated with the vertices of the primitive.

In step 122, a programmable displacement shader (or a set of programmable displacement shaders) may operate on the vertices of the micropolygons. The processing algorithm(s) implemented by the displacement shader(s) may be programmed by a user. The displacement shader(s) move the vertices in camera space. Thus, the micropolygons may be perturbed into polygons which no longer qualify as micropolygons (because their size as viewed in render pixel space has increased beyond the maximum size constraint). For example, the vertices of a microtriangle which is facing almost "on edge" to the virtual camera may be displaced in camera space so that the resulting triangle has a significantly larger projected area or diameter in render pixel space. Therefore, the polygons resulting from the displacement shading may be fed back to step 120 for tessellation into micropolygons. The new micropolygons generated by tessellation step 120 may be forwarded to step 122 for another wave of displacement shading or to step 125 for surface shading and light shading.

In step 125, a set of programmable surface shaders and/or programmable light source shaders may operate on the vertices of the micropolygons. The processing algorithm performed by each of the surface shaders and light source shaders may be programmed by a user. After any desired programmable surface shading and lighting have been performed on the vertices of the micropolygons, the micropolygons may be forwarded to step 130.

Figure 7:
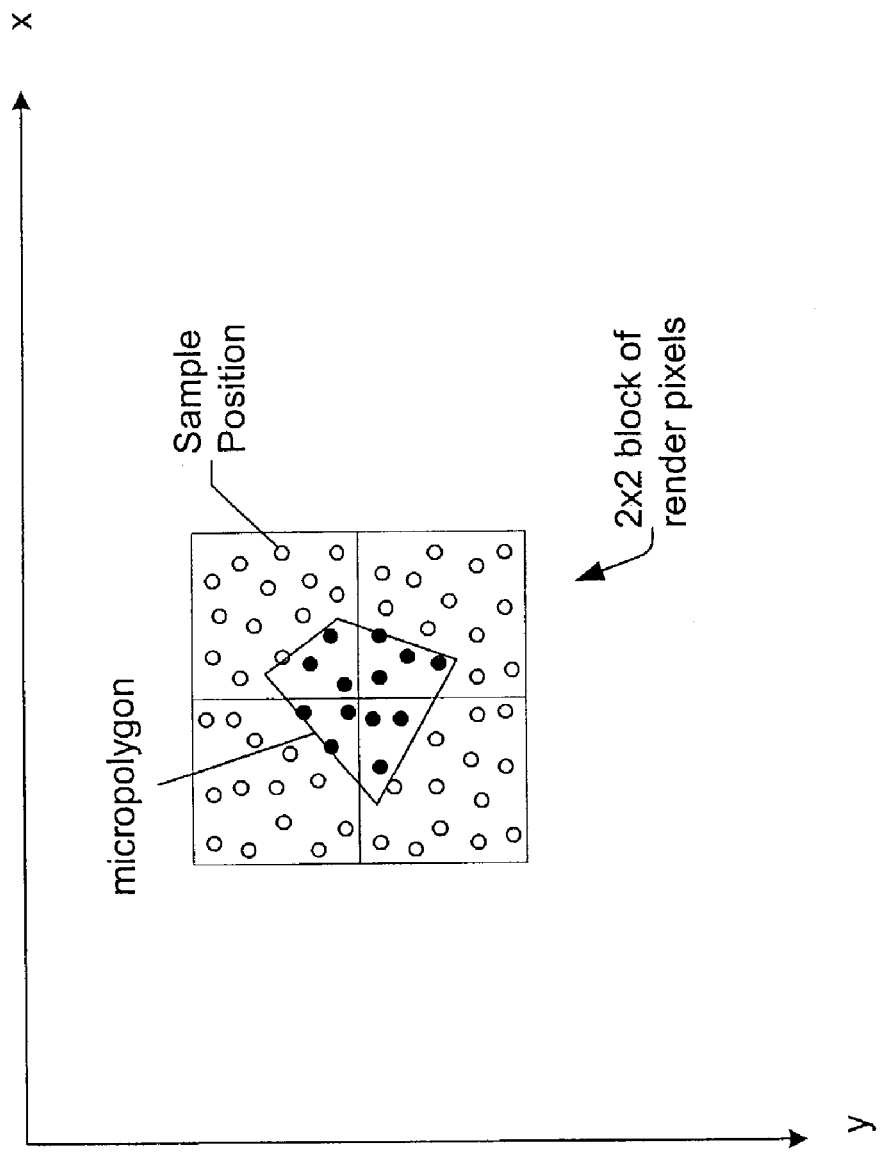
FIG. 7 illustrates a process for filling a micropolygon with samples.

In step 130, a sample fill operation is performed on the micropolygons as suggested by FIG. 7. A sample generator may generate a set of sample positions for each render pixel which has a nonempty intersection with the micropolygon. The sample positions which reside interior to the micropolygon may be identified as such. A sample may then be assigned to each interior sample position in the micropolygon. The contents of a sample may be user defined. Typically, the sample includes a color vector (e.g., an RGB vector) and a depth value (e.g., a z value or a 1/W value).

The algorithm for assigning samples to the interior sample positions may vary from one hardware implementation to the next. For example, according to a "flat fill" algorithm, each interior sample position of the micropolygon may be assigned the color vector and depth value of a selected one of the micropolygon vertices. The selected micropolygon vertex may be the vertex which has the smallest value for the sum x+y, where x and y are the render pixel space coordinates for the vertex. If two vertices have the same value for x+y, then the vertex which has the smaller y coordinate, or alternatively, x coordinate, may be selected. Alternatively, each interior sample position of the micropolygon may be assigned the color vector and depth value of the closest vertex of the micropolygon vertices.

According to an "interpolated fill" algorithm, the color vector and depth value assigned to an interior sample position may be interpolated from the color vectors and depth values already assigned to the vertices of the micropolygon.

According to a "flat color and interpolated z" algorithm, each interior sample position may be assigned a color vector based on the flat fill algorithm and a depth value based on the interpolated fill algorithm.

The samples generated for the interior sample positions are stored into a sample buffer 140. Sample buffer 140 may store samples in a double-buffered fashion (or, more generally, in an N-buffered fashion where the number N of buffer segments is a positive integer). In step 145, the samples are read from the sample buffer 140 and filtered to generate video pixels.

Figure 8:
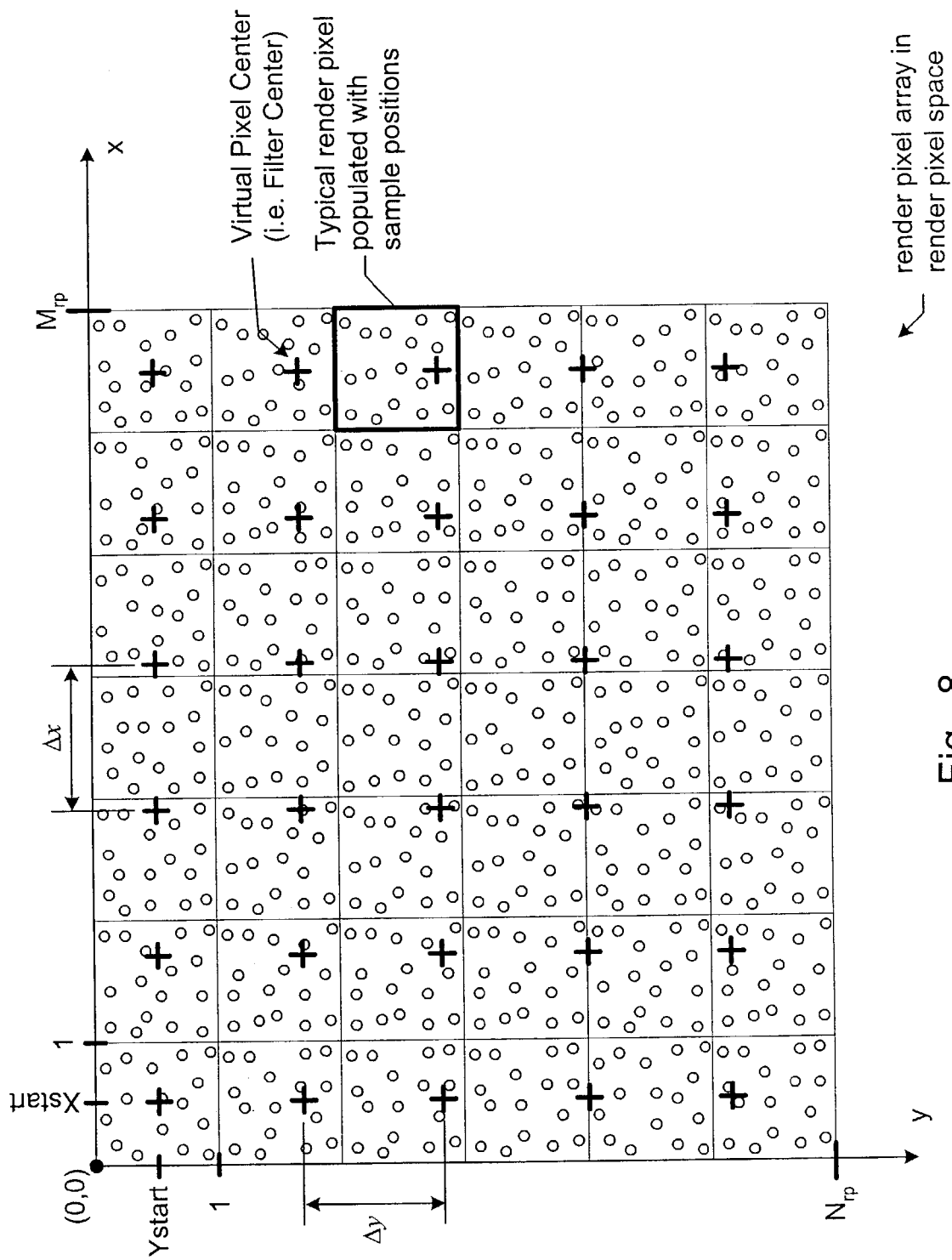
FIG. 8 illustrates an array of virtual pixel positions superimposed on an array of render pixels in render pixel space.

The rendering pipeline 100 may be configured to render primitives for an $M_{rp} \times N_{rp}$ array of render pixels in render pixel space as suggested by FIG. 8. Each render pixel may be populated with $N_{sd}$ sample positions. The values $M_{rp}$, $N_{rp}$ and $N_{sd}$ are user-programmable parameters. The values $M_{rp}$ and $N_{rp}$ may take any of a wide variety of values, especially those characteristic of common video formats.

The sample density $N_{sd}$ may take any of a variety of values, e.g., values in the range from 1 to 16 inclusive. More generally, the sample density $N_{sd}$ may take values in the interval $[1, M_{sd}]$, where $M_{sd}$ is a positive integer. It may be convenient for $M_{sd}$ to equal a power of two such as 16, 32, 64, etc. However, powers of two are not required.

The storage of samples in the sample buffer 140 may be organized according to memory bins. Each memory bin corresponds to one of the render pixels of the render pixel array, and stores the samples corresponding to the sample positions of that render pixel.

The filtering process may scan through render pixel space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position $(X_{start}, Y_{start})$. The horizontal displacement $\Delta X$, vertical displacement $\Delta Y$ and the start coordinates $X_{start}$ and $Y_{start}$ are programmable parameters. Thus, the size of the render pixel array may be different from the size of the video pixel array.

Figure 9:
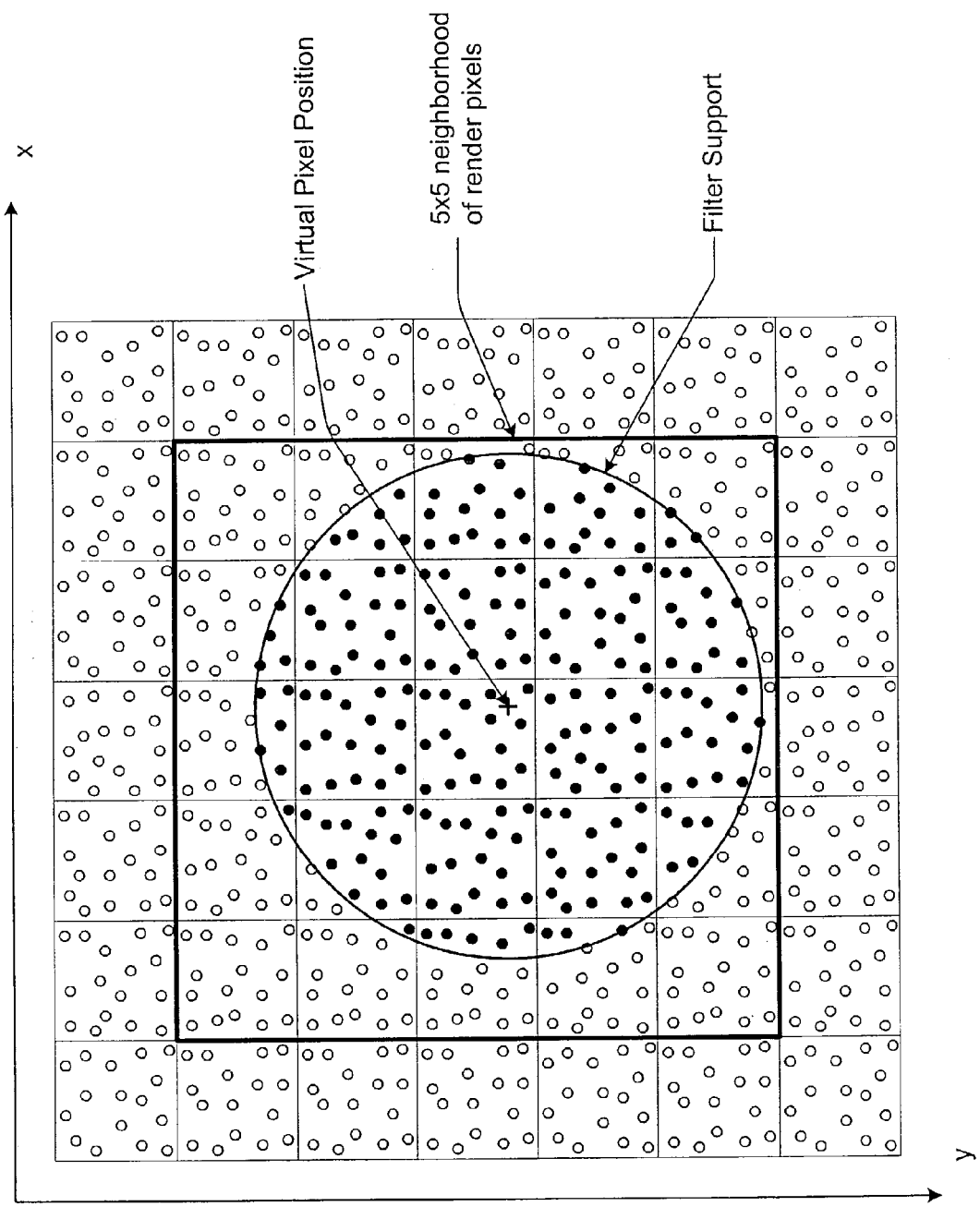
FIG. 9 illustrates the computation of a pixel at a virtual pixel position (denoted by the plus marker) according to one set of embodiments.

The filtering process may compute a video pixel at a particular virtual pixel position as suggested by FIG. 9. The filtering process may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering process may compute an initial red value rp for the video pixel P according to the expression $$r_P = \Sigma C_S r_S.$$

where the summation ranges over each sample S in the filter support region, and where $r_S$ is the red color component of the sample S. In other words, the filtering process may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering process may compute a normalization value E by adding up the filter coefficients $C_S$ for the samples S in the filter support region, i.e., $$E = \Sigma C_S.$$

The initial pixel values may then be multiplied by the reciprocal of E (or equivalently, divided by E) to determine normalized pixel values:

$$R_P = (1/E) * r_P$$

$$G_P = (1/E) * g_P$$

$$B_P = (1/E) * b_P$$

$$A_P = (1/E) * \alpha_P.$$

The filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in render pixel space on which the filter is defined. The terms "filter" and "kernel" are used as synonyms herein. Let $R_f$ denote the radius of the circular support disk.

Figure 10:
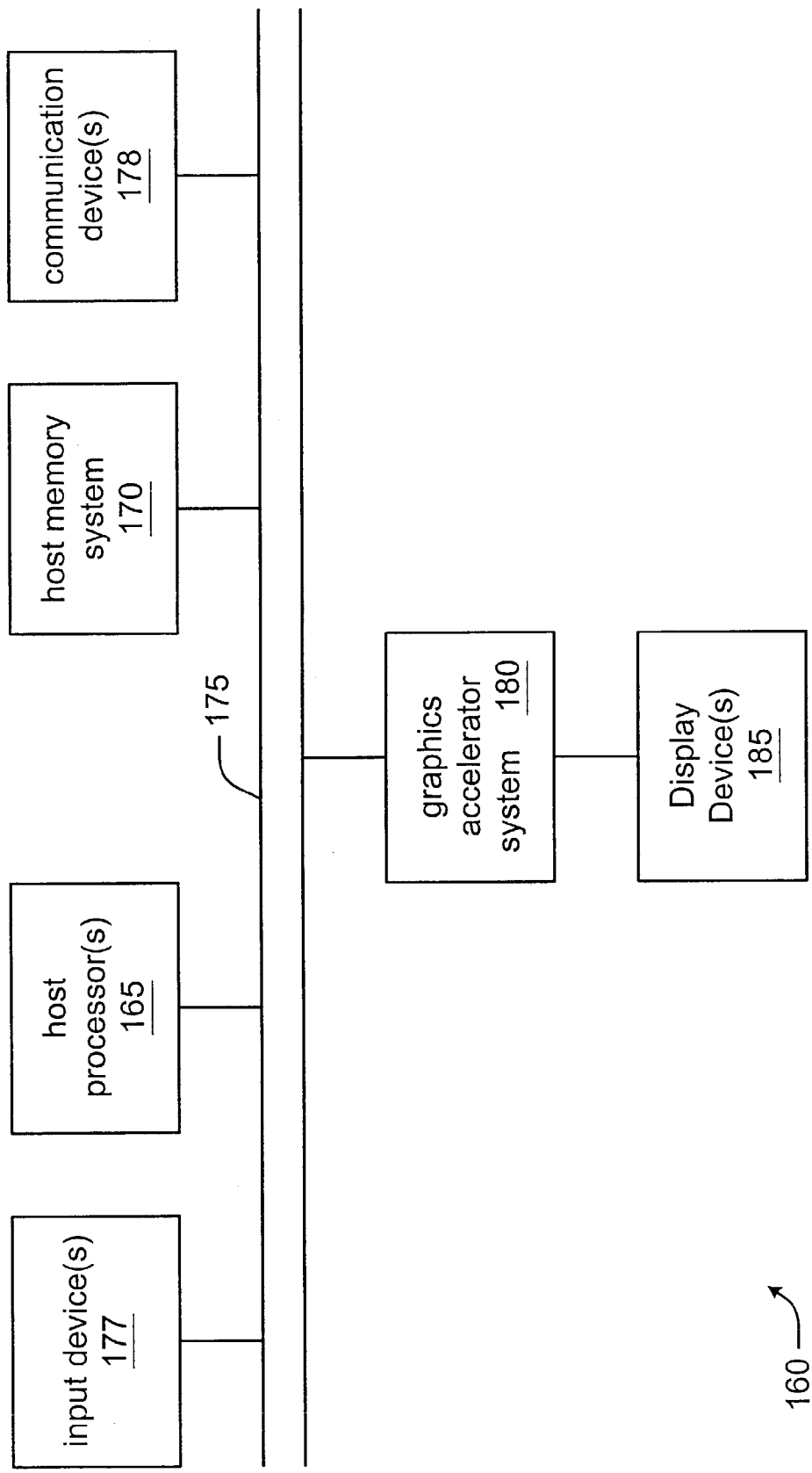
FIG. 10 illustrates one set of embodiments of computational system configured to perform graphical rendering computations.

FIG. 10 illustrates one set of embodiments of a computational system 160 operable to perform graphics rendering computations. Computational system 160 includes a set of one or more host processors 165, a host memory system 170, a set of one or more input devices 177, a graphics accelerator system 180 (also referred to herein as a graphics accelerator), and a set of one or more display devices 185. Host processor(s) 165 may couple to the host memory system 170 and graphics system 180 through a communication medium such as communication bus 175, or perhaps, through a computer network.

Host memory system 170 may include any desired set of memory devices, e.g., devices such as semiconductor RAM and/or ROM, CD-ROM drives, magnetic disk drives, magnetic tape drives, bubble memory, etc. Input device(s) 177 include any of a variety of devices for supplying user input, i.e., devices such as a keyboard, mouse, track ball, head position and/or orientation sensors, eye orientation sensors, data glove, light pen, joystick, game control console, etc. Computational system 160 may also include a set of one or more communication devices 178. For example, communication device(s) 178 may include a network interface card for communication with a computer network.

Graphics system 180 may be configured to implement the graphics computations associated with rendering pipeline 100. Graphics system 180 generates a set of one or more video signals (and/or digital video streams) in response to graphics data received from the host processor(s) 165 and/or the host memory system 170. The video signals (and/or digital video streams) are supplied as outputs for the display device(s) 185.

In one embodiment, the host processor(s) 165 and host memory system 170 may reside on the motherboard of a personal computer (or personal workstation). Graphics system 180 may be configured for coupling to the motherboard.

Figure 11:
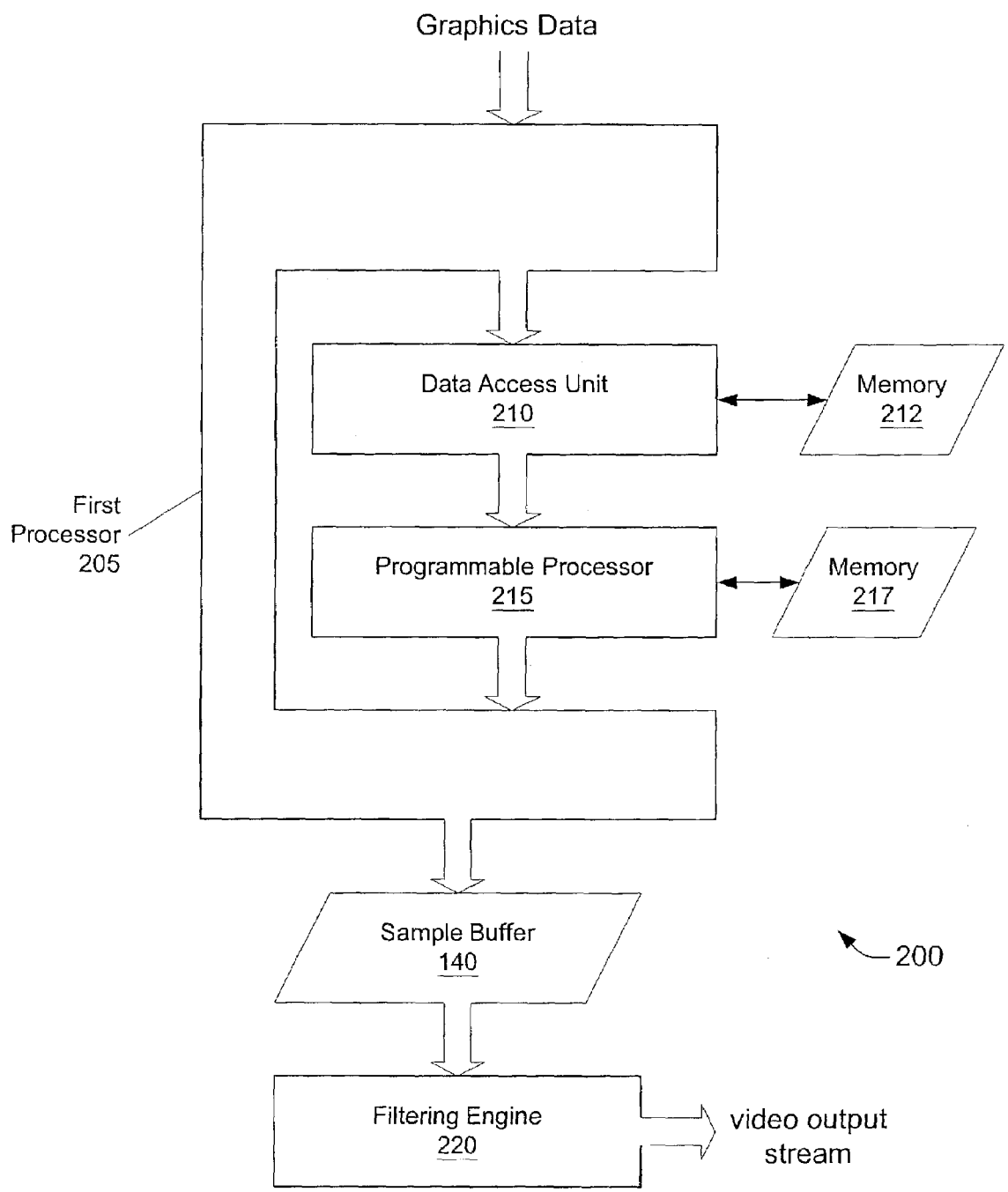
FIG. 11 illustrates one embodiment of a graphics system configured to perform per pixel programming shading.

The rendering pipeline 100 may be implemented in hardware in a wide variety of ways. For example, FIG. 11 illustrates one embodiment of a graphics system 200 which implements the rendering pipeline 100. Graphics system 200 includes a first processor 205, a data access unit 210, programmable processor 215, sample buffer 140 and filtering engine 220. The first processor 205 may implement steps 110, 112, 115, 120 and 130 of the rendering pipeline 100. Thus, the first processor 205 may receive a stream of graphics data from a graphics processor, pass micropolygons to data access unit 210, receive shaded micropolygons from the programmable processor 215, and transfer samples to sample buffer 140. In one set of embodiments, graphics system 200 may serve as graphics accelerator system 180 in computational system 160.

The programmable processor 215 implements steps 122 and 125, i.e., performs programmable displacement shading, programmable surface shading and programmable light source shading. The programmable shaders may be stored in memory 217. A host computer (coupled to the graphics system 200) may download the programmable shaders to memory 217. Memory 217 may also store data structures and/or parameters which are used and/or accessed by the programmable shaders. The programmable processor 215 may include one or more microprocessor units which are configured to execute arbitrary code stored in memory 217.

Data access unit 210 may be optimized to access data values from memory 212 and to perform filtering operations (such as linear, bilinear, trilinear, cubic or bicubic filtering) on the data values. Memory 212 may be used to store map information such as bump maps, displacement maps, surface texture maps, shadow maps, environment maps, etc. Data access unit 210 may provide filtered and/or unfiltered data values (from memory 212) to programmable processor 215 to support the programmable shading of micropolygon vertices in the programmable processor 215.

Data access unit 210 may include circuitry to perform texture transformations. Data access unit 210 may perform a texture transformation on the texture coordinates associated with a micropolygon vertex. Furthermore, data access unit 210 may include circuitry to estimate a mip map level λ from texture coordinate derivative information. The result of the texture transformation and the MML estimation may be used to compute a set of access addresses in memory 212. Data access unit 210 may read the data values corresponding to the access addresses from memory 212, and filter the data values to determine a filtered value for the micropolygon vertex. The filtered value may be bundled with the micropolygon vertex and forwarded to programmable processor 215. Thus, the programmable shaders may use filtered map information to operate on vertex positions, normals and/or colors, if the user so desires.

Filtering engine 220 implements step 145 of the rendering pipeline 100. In other words, filtering engine 220 reads samples from sample buffer 140 and filters the samples to generate video pixels. The video pixels may be supplied to a video output port in order to drive a display device such as a monitor, a projector or a head-mounted display.

Rasterization

Figure 12:
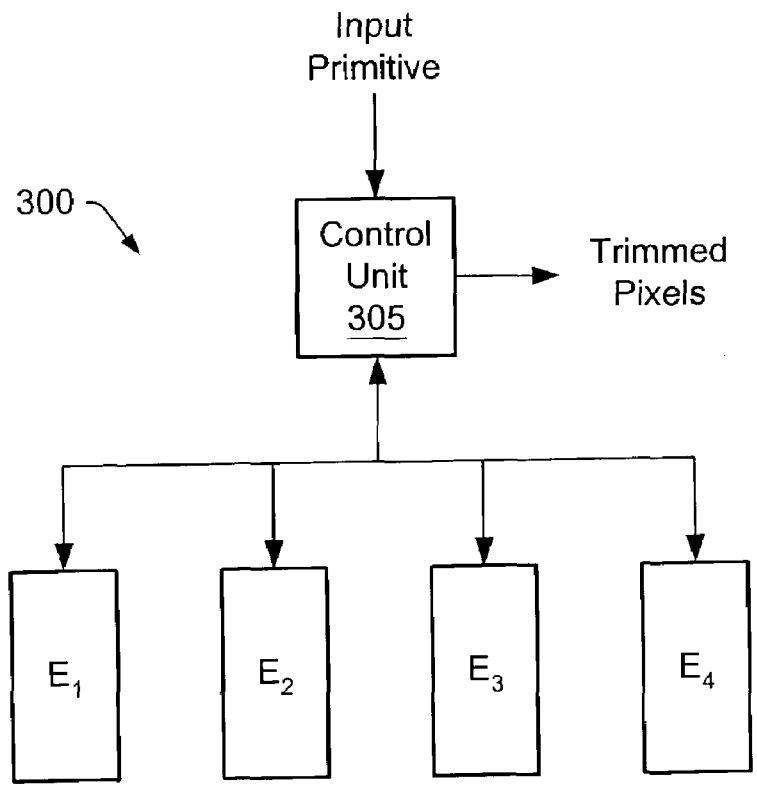
FIG. 12 illustrates one embodiment of a rasterization processor configured to generate trimmed pixels in response receiving surface primitives.

In one set of embodiments, a rasterization processor 300 may operate on primitives to generate trimmed pixels. The rasterization processor 300 may include a control unit 305 and a set of edge processing units E1, E2, E3, . . . , EN as suggested by FIG. 12, where N equals three, four, or, more generally, is an integer greater than or equal to three. The rasterization processing 300 may be used to implement step 120 of the rendering pipeline 100. In one embodiment, rasterization processor 300 may be embedded in first processor 305.

The control unit 305 may receive a primitive, e.g., a three-sided primitive or four-sided primitive. For each edge of the primitive, the control unit may transfer information describing the edge to a corresponding one of the edge processing units. For example, in response to receiving a triangle defined by the vertices A, B and C, the control unit 305 may transfer vertices A and B to edge unit E1, vertices B and C to edge unit E2, and vertices C and A to edge unit E3.

A register X residing in edge processing unit Ei may be referred to as "Ei.X". The prefix "Ei" to the register name serves as a reminder that the register resides in processing unit Ei.

Edge processing unit $E_i$ may receive two vertices defining an edge and store the vertices in registers Ei.V1 and Ei.V2. Each register includes x and y render pixel space components:

$Ei.V1=(Ei.V1.x, Ei.V1.y),$ $Ei.V2=(Ei.V2.x, Ei.V2.y).$

These four values flow through the pipeline stages of edge processing unit Ei.

The rasterizing algorithm may compute a horizontal mux bit that indicates which of the endpoints Ei.V1 or Ei.V2 has the minimum x coordinate, and a vertical mux bit that indicates which of the endpoints Ei.V1 or Ei.V2 has the minimum y coordinate. At various points in the rasterization process it is convenient to have ready access to the left and right endpoints (VL and VR) of the current edge. Rather than scrambling the endpoints values V1 and V2, demultiplexing bits are used to keep track of renaming through out the pipeline stages. Thus, for example, VLmux is a one-bit register that keeps track of which of the two endpoints (V1 or V2) is the leftmost. VRmux is simply the complement of VLmux.

The first step in the edge set-up process is to compute the x and y component deltas between the two endpoints:

$Ei.d21.x=Ei.V2.x-Ei.V1.x,$ $Ei.d21.y=Ei.V2.y-Ei.V1.y.$

The left vertex bit Ei.VLmux may be defined as the sign bit of Ei.d21.x.

Figure 13:
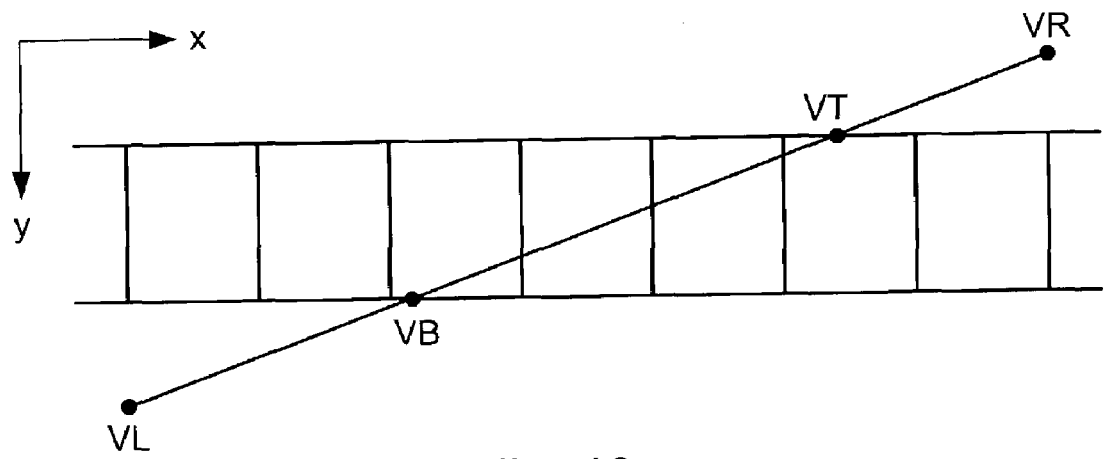
FIG. 13 illustrates the definition of intersection points VT and VB for an edge that passes all the way through the current scan line of pixels.

The rasterizing algorithm may operate on one scan line at a time. (A scan line may be one render pixel in height.) Assuming the current edge passes all the way through the current scan line, the rasterization algorithm labels the top intersection VT and the bottom intersection VB as suggested by FIG. 13. These are additional x and y storage registers kept as internal state. When the rasterization algorithm moves on to the next scan line, the contents of VB are transferred to VT (under the assumption that the algorithm proceeds from the top down), and the new value of VB is supplied by an edge walking subunit.

Figure 14:
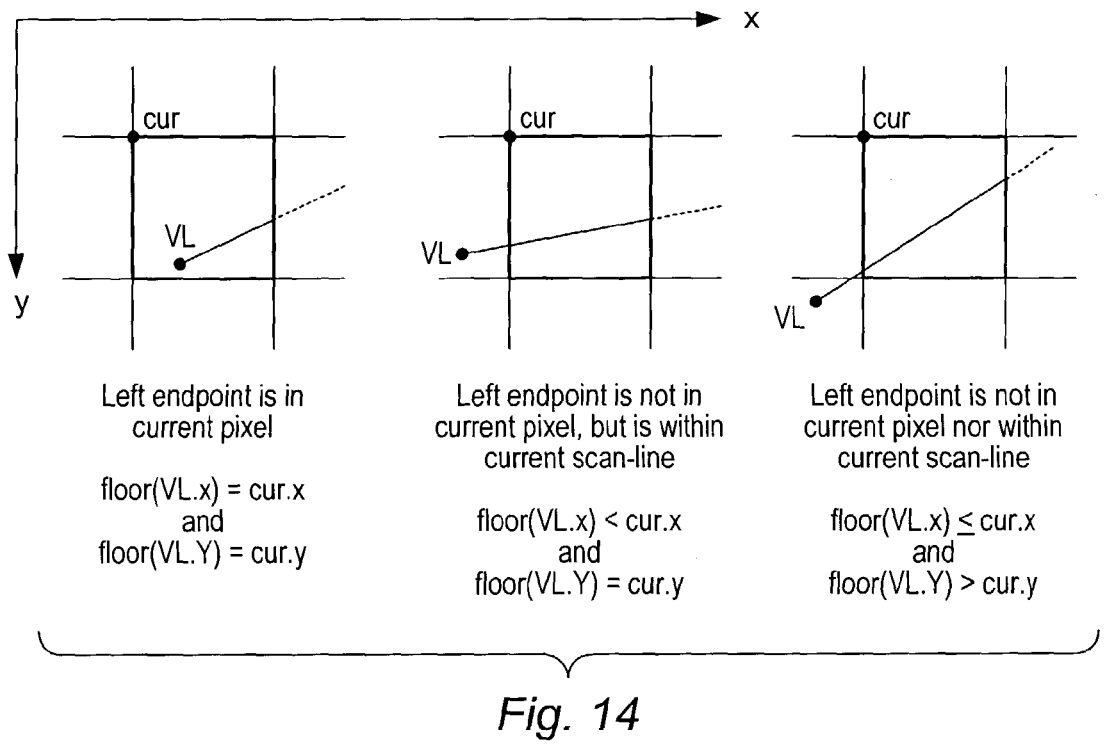
FIG. 14 illustrates several possible cases for the relationship of the left endpoint VL to the current pixel and the current scan line being processed.

Let us further break down the rasterizing problem by considering one endpoint at a time, starting with the left endpoint. The internal variable cur holds the x and y coordinates of the current pixel being processed. The relationship of the left endpoint to cur and the current scan line being processed may be one of the three shown in FIG. 14 (with appropriate tie-breaking rules). These three cases may be distinguished by comparing the floor of the left endpoint's x and y components with cur's x and y components.
(1) Left endpoint is in the current pixel if
    floor(VL.x)=cur.x AND floor(VL.y)=cur.y.
(2) Left endpoint is not in current pixel, but is within current scan line if
    floor(VL.x)<cur.x AND floor(VL.y)=cur.y.
(3) Left endpoint is not in current pixel nor within the current scan line if
    floor(VL.x)≦cur.x AND floor(VL.y)>cur.y.

Figure 15:
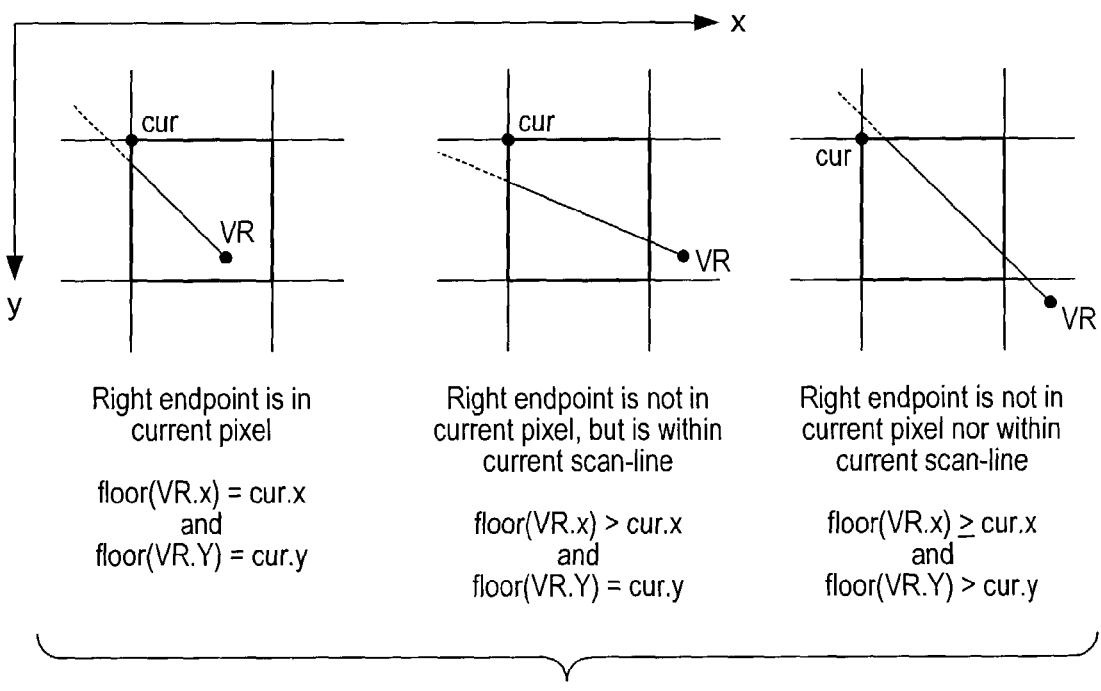
FIG. 15 illustrates several possible cases for the relationship of the right endpoint VR to the current pixel and the current scan line being processed.

The right endpoint's relationship to the current pixel and scan line can be defined analogously as indicated in FIG. 15.

Figure 16:
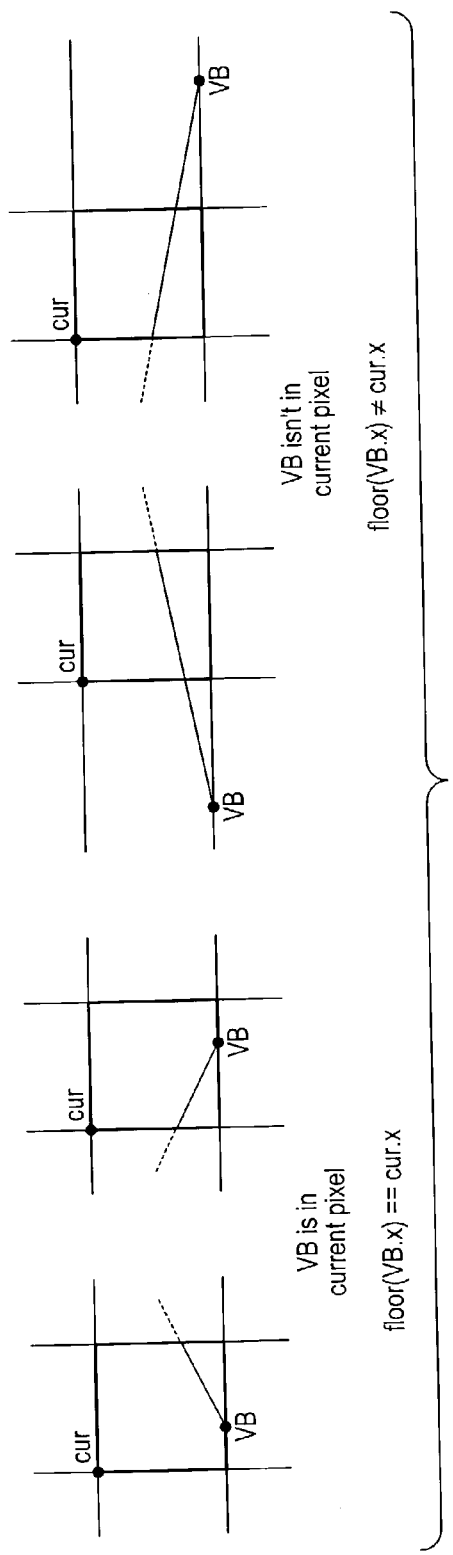
FIG. 16 illustrates a comparison of the x coordinate of the current pixel and the floor of x coordinate of intersection VB to determine whether VB lies within the current pixel.
Figure 17:
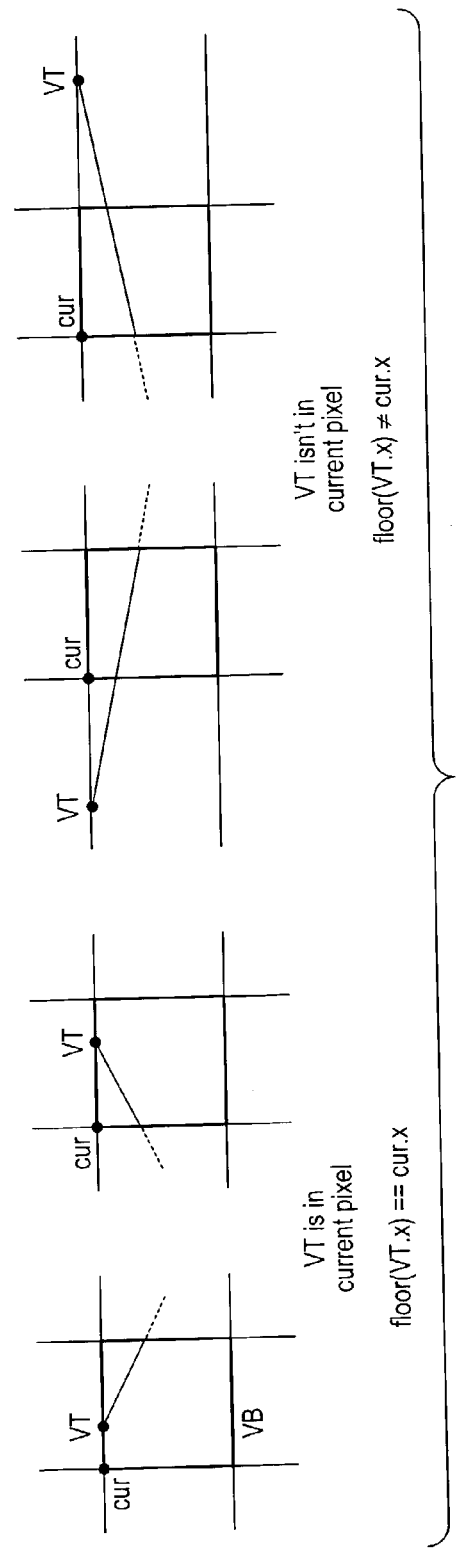
FIG. 17 illustrates a comparison of the x coordinate of the current pixel and the floor of the x coordinate of intersection VT to determine whether VT lies within the current pixel.

A comparison of cur.x and the floor of VB.x determines whether VB lies within the current pixel as suggested by FIG. 16. If floor(VB.x)=cur.x, VB is in the current pixel. Otherwise, VB is not in the current pixel. Similarly, a comparison of cur.x and the floor of VT.x determine whether VT lies within the current pixel as suggested by FIG. 17.

Note that the determinations above are based on equality comparisons of the floors of VT.x and VB.x to cur.x. Magnitude comparisons of these values may also be performed. In hardware, these computations may be accomplished by a comparator of the upper (i.e., the above the binary point) bits of VT.x and VB.x to cur.x, resulting in a two-bit value: a first bit indicating the sign of the difference between VT.x and cur.x, and a second bit indicating when the difference equals zero. These two bits are stored in the cT register. Similarly, the sign bit and zero indicator bit resulting from the comparison of VB.x and cur.x are stored in the cB register. Thus, the bits of the CT register are named cT.le0 and cT.eq0, and the bits of the CB register are named cB.le0 and cB.eq0. For convenience, virtual components of these registers are defined: cT.ge0, cT.gt0, cT.le0, and cB.ge0, cB.gt0, cB.le0. These are implemented by simple Boolean gatings of the two real components. For example, cT.ge0=cT.eq0 OR (NOT cT.le0).

Define two Boolean values to indicate when the current pixel is at the left most or right most ends of the current scan line:

Lend=((d21.x<0)? cB.eq0:cT.eq0),

Rend=((d21.x<0)? cT.eq0:cB.eq0).

A final Boolean value indicates when the current pixel is on or between these two ends:

inEdge=((d21.x<0)? (cB.ge0 && cT.le0): (cT.ge0 && cB.le0)).

The symbol "&&" denotes the logical AND operator. Depending on the outer control loop, an optimized implementation may be able to dispense with one or more of these values.

Figure 18:
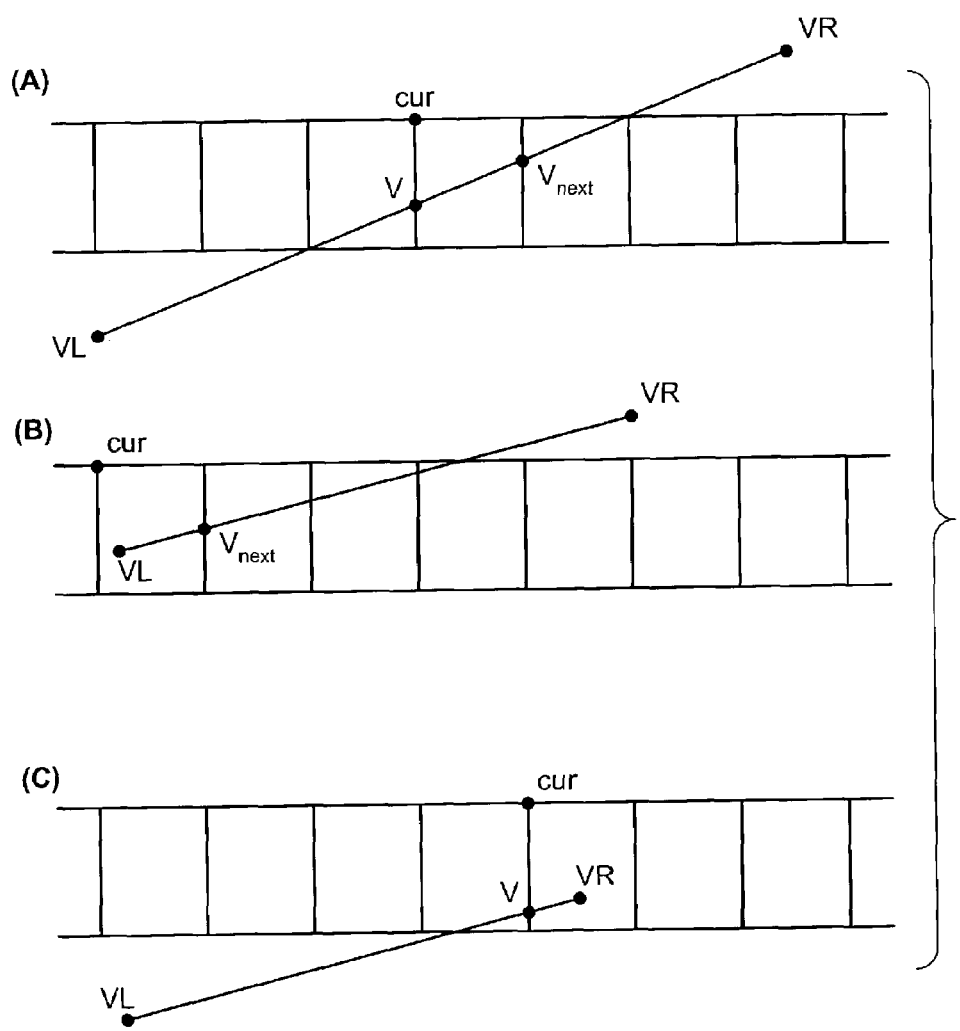
FIGS. 18A–C illustrate three different ways an edge may intersect the current pixel depending on whether the current pixel is at the left end of the edge, the right end of the edge, or in between the left and right ends.

With these definitions, it is possible to answer the question: does this edge trim the current pixel, and if so, what are the two endpoints of that portion of the edge that intersects the current pixel? The question of the need to add a trimming edge is answered by the value of the Boolean inEdge. The left and right endpoints of this trimming edge are Lend?VL:V and Rend?VR:nextV respectively as indicated by FIGS. 18A–C. The points V and nextV are the intersection of the line segment edge with the left edge and the right edge of the current pixel. They are computed by interpolating positions between the two original endpoint x and y values using a scalar fraction defined by the ratio of (cur.x−V1.x) to (V2.x−V1.x) for V and the ratio of (cur.x+1−V1.x) to (V2.x−V1.x) for nextV.

Edge Unit Pipeline

The previous section developed most of the internal registers and Boolean values used to determine a particular edge's contribution to the trimming of pixels in the current scan line. This trim edge generation may take place as the final pipeline stage of the edge unit's computation. However, to arrive at this stage, several set-up and edge walking stages come first. This section describes the set of pipeline stages according to one set of embodiments.

Stage 1

Stage 1 is where the two edge endpoints are received and operated on.

Inputs: Ei.V1.x, Ei.V1.y, Ei.V2.x, Ei.V2.y

1 Subtractor: (Ei.V2.x−Ei.V1.x) goes to Ei.d21.x latch
1 Subtractor: (Ei.V2.y−Ei.V1.y) goes to Ei.d21.y latch
1 XOR of upper bits: (floor(Ei.V1.x)==floor(Ei.V2.x)) goes to Ei.isH latch
1 XOR of upper bits: (floor(Ei.V1.y)==floor(Ei.V2.y)) goes to Ei.isV latch Outputs: Ei.V1.x, Ei.V1.y, Ei.V2.x, Ei.V2.y, Ei.d21.x, Ei.d21.y, Ei.isH, Ei.isV Stage 2

Stage two computes reciprocals of the deltas, and passes the y bounds of the edge to the control unit.

Inputs: Ei.V1.x, Ei.V1.y, Ei.V2.x, Ei.V2.y, Ei.d21.x, Ei.d21.y, Ei.isH, Ei.isV.

1 (fixed point) reciprocal: 1/Ei.d21.x goes to Ei.D21.x register.
1 (fixed point) reciprocal: 1/Ei.d21.y goes to Ei.D21.y register.

Based on sign of Ei.d21.y, send the minimum of Ei.V1.y and Ei.V2.y to a vertical minimum unit and the maximum of Ei.V1.y and Ei.V2.y to a vertical maximum unit.

(The vertical minimum unit computes the minimum of the Y coordinates of the vertices of the current polygon. The vertical maximum unit computes the maximum of the Y coordinates of the vertices of the current polygon. These logic units may reside in the control unit, or, at some other location external to the edge units.)

Also, send Ei.isH and Ei.isV to the control unit.

Outputs: Ei.V1.x, Ei.V1.y, Ei.V2.x, Ei.V2.y, Ei.d21.x, Ei.d21.y, Ei.isH, Ei.isV, Ei.D21.x, Ei.D21.y Stage 3

Stage 3 is the initial edge walking down to the first valid scan line intersection of the edge (if it exists). This stage may be pipelined three or more deep to ensure single clock pixel output in all cases.

Inputs: Ei.V1.x, Ei.V1.y, Ei.V2.x, Ei.V2.y, Ei.d21.x, Ei.d21.y, Ei.isH, Ei.isV, Ei.D21.x, Ei.D21.y, (cur.y+1)

When enabled (by the control unit), perform the interpolation IVy(cur.y+1, Ei) and store the result in the VB register. The notation IVy(*,*) denotes interpolation along the y coordinate. See more precise definition of IVy below.

Outputs: Ei.V1.x, Ei.V1.y, Ei.V2.x, Ei.V2.y, Ei.d21.x, Ei.d21.y, Ei.isH, Ei.isV, Ei.D21.x, VB Stage 4

Inputs: Ei.V1.x, Ei.V1.y, Ei.V2.x, Ei.V2.y, Ei.d21.x, Ei.d21.y, Ei.isH, Ei.isV, Ei.D21.x, Ei.D21.y, cur.y, VB.

Compute VT mux bits G0 and G1 defined by:

$$G0 = (Ei.d21.y < 0)$$

$$G1 = (cur.y == floor(G0?Ei.V2.y:Ei.V1.y)).$$

The mux bits G0 and G1 may used to select the value of VT for the current scan line from among the values V1, V2 or VB (from the previous scan line) according to the expression VT=(G1 ? (G0?Ei.V2.y:Ei.V1.y): VB). Thus, VT may be described as the point in the intersection of the current pixel and the edge segment having a maximum vertical coordinate. The mux bits G0 and G1 are collectively referred to as VTmux.

Compute mux bit H1 defined by:

$$H1 = (cur.y == floor((!G0)?Ei.V2.y:Ei.V1.y))$$

The mux bits G0 and H1 may be used to select the value of VB for the current scan line from among the values V1, V2 or IVy(cur.y+1,Ei) according to the expression:

$$VB = (H1 ? ((!G0)?Ei.V2.y:Ei.V1.y):IVy(cur.y+1,Ei)).$$

The VB may be described as the point in the intersection of the current pixel and the edge segment having a minimum vertical coordinate. The bits (!G0) and H1 are collectively referred to as VBmux.

Send the x coordinate of VL (using VL mux bit) to the horizontal minimum unit.

Send the x coordinate of VR (using VR mux bit) to the horizontal maximum unit.

(The horizontal minimum unit computes the minimum of the values VL.x provided by the edge units, and thus, the minimum X coordinate of the original polygon. The horizontal maximum unit computes the maximum of the values VR.x provided by the edge units, and thus, the maximum X coordinate of the original polygon. These logic units may reside in the control unit, or, at some other location external to the edge units.)

Outputs: Ei.V1.x, Ei.V1.y, Ei.V2.x, Ei.V2.y, Ei.d21.x, Ei.d21.y, Ei.isH, Ei.isV, Ei.D21.x, Ei.D21.y, VB, VBmux, VTmux, VLmux, VRmux. VL and VR are passed out to the horizontal minimum unit and horizontal maximum unit respectively.

Stage 5

Stage 5 is the pixel trimming inner loop as described in the last section.

Inputs: Ei.V1.x, Ei.V1.y, Ei.V2.x, Ei.V2.y, Ei.d21.x, Ei.d21.y, Ei.isH, Ei.isV, Ei.D21.x, Ei.D21 .y, VB, VBmux, VTmux, VL mux bit, VR mux bit, cur.x, cur.y 1 comparator: (cur.x<compare>floor(VB.x)) goes to cB
1 comparator: (cur.x<compare>floor(VT.x)) goes to cT Lend=((Ei.d21.x<0)? cB.eq0:cT.eq0)
Rend=((Ei.d21.x<0)? cT.eq0:cB.eq0)
inEdge=((Ei.d21.x<0)? cB.ge0 && cT.le0:cT.ge0 && cB.le0)

inEdge && !Rend: perform the interpolation IVx(cur.x+1, Ei) and send result to nextV latch. In other words, if the condition (inEdge AND !Rend) is satisfied, interpolate the position for nextV along the current edge at the x=cur.x+1. The symbol "!" is used to indicate logical negation.

inEdge: start addTrim(Lend?VL:V, Rend?VR:nextV). In other words, if the condition (inEdge) is satisfied, add trimming information defined by the vertices $V_G$=Lend?VL:V and $V_H$=Rend?VR:nextV to the current pixel.

(Before the next cycle, the contents of nextV will be latched into V.)

Polygon Control Unit

While the edge processing units (and interpolators) bear most of the computational burden of the rasterization process, the overall sequencing of the edge processing units is controlled by a polygon control unit (e.g. control unit 305). The polygon control unit receives the values Ei.isH, Ei.isV from each edge unit Ei, and the values MinY and MaxY from the vertical minimum unit and vertical maximum unit respectively.

If all edges are isH and isV, the polygon resides entirely in one pixel (i.e., render pixel), and the original polygon edges are sent out as clipping edges for that pixel.

If all edges are isH, the polygon is all in one row (i.e., horizontal row), and y stepping is not needed at stage 3.

If all edges are isV, the polygon resides in one column (i.e., vertical column), and x stepping is not needed. However, Y stepping is still enabled.

If none of the three previous cases apply, the polygon is more general, and Y stepping and looping in both x and y are performed.

```
for (cur.y = MinY; cur.y ≤ MaxY; cur.y++) {
    if (cur.y < MaxY) enable stage 3
    Gather MinX from the horizontal min unit and MaxX from the
    horizontal max unit
    if (floor(MinX) == floor(MaxX))
        X reciprocal and IV( ) will not be needed this scan line
    else
        start 1/(MaxX−MinX) reciprocal
    for (cur.x = MinX; cur.x ≤ MaxX; cur.x++) {
        send to stage 5
    }
}
```

The next polygon behind this one can advance through stages 1 and 2, holding before stage 3 until after the start of the last scan line of the previous polygon, at which point the next one can advance to stage 3 and 4, holding off until the last pixel of the previous polygon finishes stage 5.

Interpolate Vertex Unit

In the pseudo code, vertex interpolation appears in several variations. The functions IVx() and IVy() derive their scalar interpolation fractions from other endpoint information:

$$IVx(x, Ei) = IV\left(\frac{x - Ei \cdot V1 \cdot x}{Ei \cdot V2 \cdot x - Ei \cdot V1 \cdot x}, Ei \cdot V1, Ei \cdot V2\right)$$

$$IVy(y, Ei) = IV\left(\frac{y - Ei \cdot V1 \cdot y}{Ei \cdot V2 \cdot y - Ei \cdot V1 \cdot y}, Ei \cdot V1, Ei \cdot V2\right)$$

The function IV($\sigma$, V1, V2) represents an interpolation computation. In one embodiment, the interpolation of the components of vertices V1 and V2 may be performed in render pixel space:

$$Ei.V.x = \sigma*(Ei.V1.x) + (1-\sigma)*(Ei.V2.x),$$

$$Ei.V.y = \sigma*(Ei.V1.y) + (1-\sigma)*(Ei.V2.y).$$

In another embodiment, the scalar fraction $\sigma$ may be transformed to determine a corresponding camera space fraction $\sigma^C$ as described above, and the camera space fraction $\sigma^C$ may be used to perform an interpolation of vertex coordinates in camera space. In yet another embodiment, the scalar fraction G may be transformed to determine a corresponding virtual world space fraction $\sigma^W$, and the virtual world space fraction may be used to perform an interpolation of vertex coordinates in virtual world space.

Methodology for Rasterizing Primitives

Figure 19:
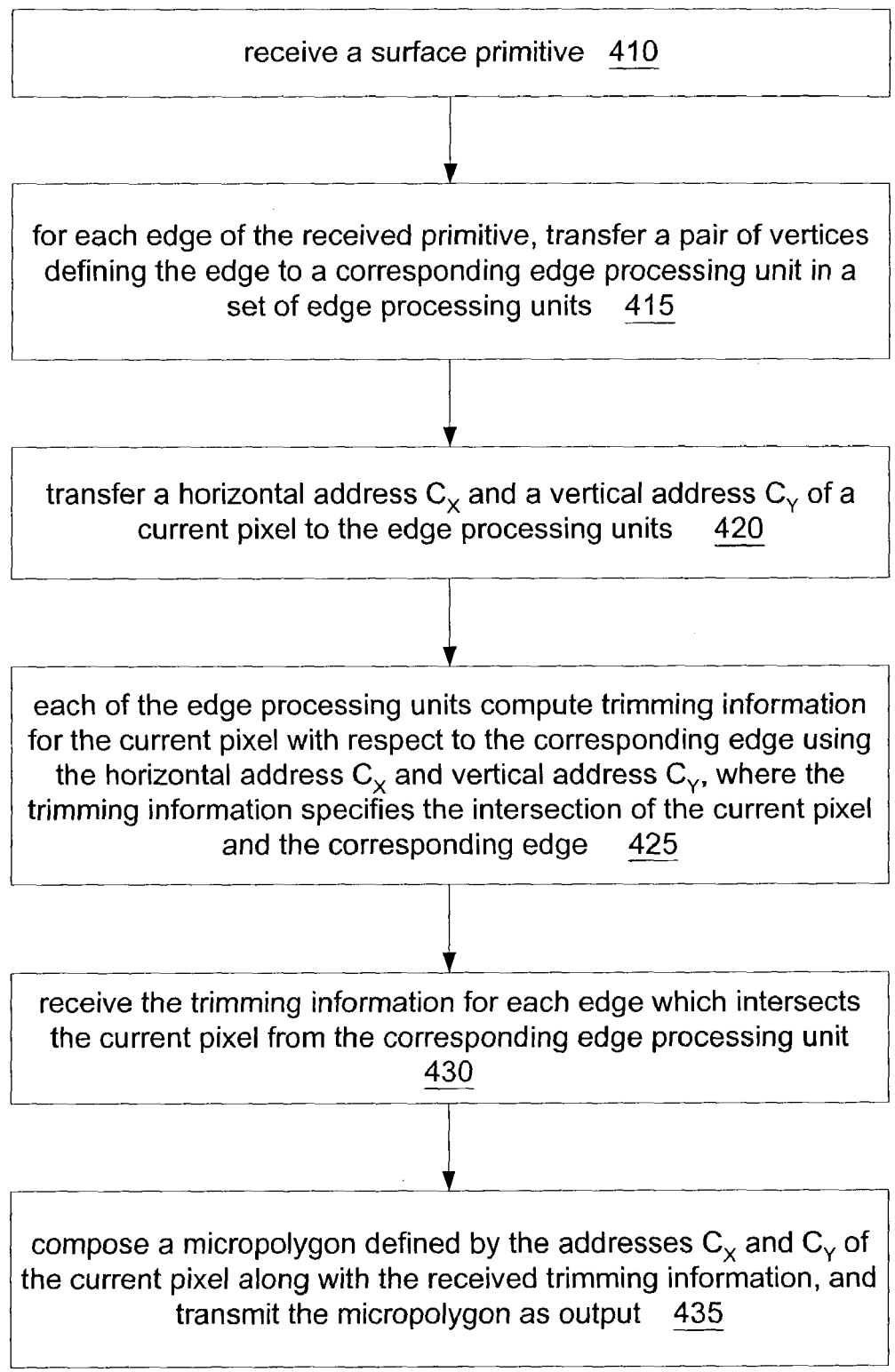
FIG. 19 illustrates one embodiment of a method for rasterizing primitives.

FIG. 19 illustrates one set of embodiments of a method for rasterizing primitives. The method may include:

receiving a surface primitive (step 410);

for each edge of the received primitive, transferring a pair of vertices defining the edge to a corresponding edge processing unit of a set of edge processing units (step 415), and transferring a horizontal address $C_X$ and a vertical address $C_Y$ of a current pixel to the edge processing units (step 420);

each of the edge processing units computing trimming information for the current pixel with respect to the corresponding edge using the horizontal address $C_X$ and vertical address $C_Y$, where the trimming information specifies a portion of the corresponding edge which intersects the current pixel (step 425);

receiving the trimming information for each edge which intersects the current pixel from the corresponding edge processing unit (step 430) and composing a micropolygon defined by the addresses $C_X$ and $C_Y$ of the current pixel along with the received trimming information, and transmitting the micropolygon as output (step 435).

Note that in various embodiments the rasterization processes described herein may be performed in render pixel space, camera space or virtual world space, or, in any combination of these spaces.

Although the various embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A graphical computing system comprising:

a control unit and a set of edge processing units;

wherein the control unit is configured to (a) receive a surface primitive, (b) transfer edge specifying information for each edge of the surface primitive to a corresponding one of the set of edge processing units, wherein each edge is processed by a different corresponding edge processing unit, and (c) transfer a horizontal address $C_X$ and a vertical address $C_Y$ of one current pixel to the edge processing units;

wherein each of the edge processing units is configured to compute trimming information for the one current pixel with respect to the corresponding edge using the horizontal address $C_X$ and vertical address $C_Y$, wherein the trimming information specifies a portion of the corresponding edge which intersects the area of the one current pixel;

wherein the control unit is configured to collect the trimming information from the edge processing units, compose a micropolygon defined by the addresses $C_X$ and $C_Y$ of the one current pixel along with the collected trimming information, and transmit the micropolygon as output;

wherein the micropolygon is identical to the portion of the area of the one current pixel that is within the surface primitive; and wherein rendered values for one or more samples within the micropolygon at least partially determine one or more of the pixel values used to display at least a portion of the surface primitive on a display device.

2. The graphical computing system of claim 1, wherein the trimming information computed by each of said edge processing units for the one current pixel specifies any intersection of the corresponding edge with the boundary of the one current pixel.

3. The graphical computing system of claim 1, wherein the trimming information computed by each of said edge processing units for the one current pixel specifies any endpoint of the corresponding edge in the interior of the one current pixel.

4. The graphical computing system of claim 1, wherein the set of edge processing units includes three or more edge processing units.

5. The graphical computing system of claim 1, wherein the control unit is configured to determine, for each edge of the primitive, which side of the edge contains the interior of the primitive, and to compose the micropolygon based on this determination.

6. The graphical computing system of claim 1, wherein the control unit is configured to determine, for each edge of the micropolygon, an ownership bit indicating whether the edge is owned by the micropolygon for the sake of any sample position landing on the edge in a sample fill process.

7. The graphical computing system of claim 1, wherein the control unit is configured to determine, for all vertices of the micropolygon, an ownership bit indicating whether each vertex of the micropolygon is owned by the micropolygon for the sake of any sample position landing on the edge in a sample fill process.

8. The graphical computing system of claim 1, further comprising a programmable processor, wherein the programmable processor is configured to receive and execute program code, wherein, in response to execution of the program code, the programmable processor is configured to receive the micropolygon and to perform one or more shading operations determined by the program code on the micropolygon.

9. The graphical computing system of claim 8, wherein the shading operations include displacement mapping, wherein the programmable processor is configured to forward a new primitive, resultant from performing said displacement mapping on the micropolygon, to the control unit for a second pass of rasterization.

10. A graphical computing system comprising:
a means for controlling a process for rasterization of primitives;
a plurality of means for processing edges;
wherein the controlling means is configured to (a) receive a surface primitive, (b) transfer edge specifying information for each edge of the surface primitive to a corresponding one of the edge processing means, wherein each edge is processed by a different corresponding edge processing means, and (c) transfer a horizontal address $C_X$ and a vertical address $C_Y$ of one current pixel to each of the edge processing means;
wherein each of the edge processing means is configured to compute trimming information for the one current pixel with respect to the corresponding edge using the horizontal address $C_X$ and vertical address $C_Y$, wherein the trimming information specifies a portion of the corresponding edge which intersects the area of the one current pixel;
wherein the controlling means is configured to receive the trimming information from each of the edge processing means and generate a micropolygon determined from the addresses $C_X$ and $C_Y$ of the one current pixel along with the collected trimming information,
wherein the area of the micropolygon equals the portion of the one current pixel that resides within the surface primitive; and
wherein rendered values for one or more samples within the micropolygon at least partially determine one or more of the pixel values used to display at least a portion of the surface primitive on a display device.

11. The graphical computing system of claim 10, wherein the trimming information computed by each of the edge processing means for the one current pixel specifies any intersection of the corresponding edge with the boundary of the one current pixel.

12. The graphical computing system of claim 10, wherein the trimming information computed by each of the edge processing means for the one current pixel specifies any endpoint of the corresponding edge in the interior of the area of the one current pixel.

13. A graphical computing system comprising:
a control unit and a set of edge processing units;
wherein the control unit is operable, for each edge of a received surface primitive, to transfer a pair of vertices defining the edge to a corresponding one of the set of edge processing units, wherein each edge is processed by a different corresponding edge processing unit, and wherein the control unit is further configured to transfer a horizontal address $C_X$ and a vertical address $C_Y$ of a current pixel to the edge processing units;
wherein each of the edge processing units is configured to compute trimming information for the current pixel with respect to the corresponding edge using the horizontal address $C_X$ and vertical address $C_Y$,
wherein the trimming information specifies a portion of the corresponding edge which intersects the current pixel;
wherein the control unit is configured to receive the trimming information for each edge that intersects the current pixel from the corresponding edge processing unit and transmit an output packet including the addresses $C_{CX}$ and $C_Y$ of the current pixel along with the received trimming information;
wherein the output packet is usable to determine a micropolygon, and wherein the area of the micropolygon equals the portion of the current pixel that resides within the surface primitive; and
wherein rendered values for one or more samples within the micropolygon at least partially determine one or more of the pixel values used to display at least a portion of the surface primitive on a display device.

14. The graphical computing system of claim 13, wherein the control unit includes a horizontal traversal circuit and a vertical traversal circuit, wherein the horizontal traversal circuit and vertical traversal circuit scan the two-dimensional address $(C_X, C_Y)$ of the current pixel over a rectangular region which covers the surface primitive.

15. The graphical computing system of claim 13, wherein the edge processing units operate in parallel in response to control signals asserted by the control unit.

16. The graphical computing system of claim 13, wherein each edge processing unit is configured to compute the trimming information for the current pixel in response to detecting that the corresponding edge intersects the current pixel.

17. The graphical computing system of claim 13, further comprising a programmable processor, wherein the programmable processor is configured to receive and execute program code, wherein, in response to execution of the program code, the programmable processor is configured to receive the output packet and to perform a shading operation determined by the program code on the micropolygon defined by the addresses $C_X$ and $C_Y$ and the trimming information.

18. The graphical computing system of claim 17, wherein the shading operations include displacement mapping, wherein the programmable processor is configured to forward a new primitive, resultant from performing said displacement mapping on the micropolygon, to the control unit for a second pass of rasterization.

19. The graphical computing system of claim 13, further comprising a sample fill unit, wherein the sample fill unit is configured to receive the output packet and to perform a sample fill operation on the micropolygon defined by the address $C_X$ and $C_Y$ and the trimming information.

20. A method for processing primitives in a graphical computing system comprising:
   receiving a surface primitive;
   for each edge of the received surface primitive, transferring a pair of vertices defining the edge to a corresponding edge processing unit of a set of edge processing units, wherein each edge is processed by a different corresponding edge processing unit, and transferring a horizontal address $C_X$ and a vertical address $C_Y$ of a current pixel to the edge processing units;
   each of the edge processing units computing trimming information for the current pixel with respect to the corresponding edge using the horizontal address $C_X$ and vertical address $C_Y$, wherein the trimming information specifies a portion of the corresponding edge which intersects the current pixel;
   receiving the trimming information for each edge which intersects the current pixel from the corresponding edge processing unit;
   composing a micropolygon defined by the addresses $C_X$ and $C_Y$ of the current pixel along with the received trimming information; and
   transmitting the micropolygon as output;
   wherein rendered values for one or more samples within the micropolygon at least partially determine one or more of the pixel values used to display at least a portion of the surface primitive on a display device.

21. The method of claim 20, further comprising scanning the two-dimensional address $(C_X, C_Y)$ of the current pixel over a rectangular array of pixels that covers the surface primitive.

* * * * *

UNITED STATES PATENT AND TRADEMARK OFFICE
CERTIFICATE OF CORRECTION

| | | |
|---|---|---|
| PATENT NO. | : 7,199,806 B2 | Page 1 of 1 |
| APPLICATION NO. | : 10/392282 | |
| DATED | : April 3, 2007 | |
| INVENTOR(S) | : Michael F. Deering | |

It is certified that error appears in the above-identified patent and that said Letters Patent is hereby corrected as shown below:

Column 20 Line 47, delete "addresses Ccx and Cy of the current pixel" and substitute -- addresses Cx and Cy of the current pixel --.

Signed and Sealed this

Twelfth Day of June, 2007

JON W. DUDAS
*Director of the United States Patent and Trademark Office*